United States Patent [19]
Pu et al.

[11] Patent Number: 6,020,452
[45] Date of Patent: Feb. 1, 2000

[54] CHIRAL BIPHENYL COMPOUNDS FOR USE IN ASYMMETRIC REACTIONS

[75] Inventors: Lin Pu; Wei-Sheng Huang; Qiao-Sheng Hu, all of Fargo, N. Dak.

[73] Assignee: North Dakota State University, Fargo, N. Dak.

[21] Appl. No.: 08/920,281

[22] Filed: Aug. 26, 1997

Related U.S. Application Data

[63] Continuation-in-part of application No. 08/756,748, Nov. 26, 1996, abandoned.

[51] Int. Cl.[7] ..................................................... C08G 16/00
[52] U.S. Cl. .............................. 528/86; 528/97; 528/125; 528/127; 528/138; 528/225; 528/230; 528/234; 528/480; 528/495; 528/503
[58] Field of Search .............................. 528/86, 230, 234, 528/480, 495, 503, 97, 125, 127, 138, 225, 248

[56] References Cited

PUBLICATIONS

Ishihara, K. et al., "Brønsted Acid Assisted Chiral Lewis Acid (BLA) Catalyst for Asymmetric Diels–Alder Reaction", *J. Am. Chem. Soc.*, 116(4):1561–1562 (1994).

Ishihara, K. et al., "A New Powerful and Practical BLA Catalyst for Highly Enantioselective Diels–Alder Reaction: An Extreme Acceleration of Reaction Rate by Brønsted Acid", *J. Am. Chem. Soc.*, 118(12):3049–3050 (1996).

Maruoka, K. et al., "Chiral Helical Lewis Acids for Asymmetric Diels–Alder Catalysts", *J. Org. Chem*, 58(11):2938–2939 (1993).

Abstract from Fargo Conference on Main Group Chemistry, Fargo, N.D. (May 30–Jun.1, 1996).

Anderson, et al., "A New Family of Chiral Binaphthyl–Derived Cyclophane Receptors: Complexation of Pyranosides", *Angew. Chem. Int. Ed. Eng.*, 34(15): 1596–1600 (1995).

Bedworth, et al., "Synthesis of A Chiral Nonracemic Segmented Screwlike Oligomer. An Unusual Form of Molecular Chirality", *Macromolecules*, 27(2): 622–624 (1994).

Belohradsky, et al., "Reaction of 1,4–Dibromo–2,3–dihydroxynaphthalene with 2–Naphthoxide Ion. Solvent and Cation Control in the Formation of the Conformationally Locked Stereoisomers of 2,2',3',2''–Tetrahydroxy–1, 1':4'1''–ternaphthyl and 2,2',3',2'',3''',2''–Hexahydroxy–1,1':4'',1'':4',1''–quaternaphthyl'', *J. Org. Chem.*, 61(4): 1205–1210 (1996).

Bernardo, K. et al., "Synthesis and Characterization of New Chiral Schiff Base Complexes with Diiminobinaphthyl or Diiminocyclohexyl Moieties as Potential Enantioselective Epoxidation Catalysts", *Inorganic Chemistry*, 35(2): 387–396 (1996).

Bhowmik, et al., "Fully Aromatic Liquid Crystalline Homopolyesters and Copolyesters of 1,1'–Binaphthyl–4, 4'–Diol", *J. Polym. Sci. Part A: Polym. Chem.*, 32: 651–659 (1994).

Brown, K. et al., "Synthesis of Optically Active 2,2'–Dihalo–1,1'–binaphthyls via Stable Diazonium Salts", *J. Org. Chem.*, 50: 4345–4349 (1985).

Cheng, H. et al., "The First Sterically Regular Chiral Conjugated Crown Ether Polymer", *Tetrahedron: Asymmetry*, 7(11): 3083–3086 (Nov. 1996).

Chow, et al., "Synthesis, Chiropitcal and Redox Properties of Axially Chiral Binaphthol–based Oligomers", *Tetrahedron: Asymmetry*, 7(8): 2251–2262 (1996).

Cox, et al., "Expedient Route to 3– and 3,3'–Substituted 1,1'–Bi–2–Naphthols by Directed ortho Metalation and Suzuki Cross Coupling Methods", *Tetrahedron Letters*, 33(17): 2253–2256 (1992).

Deloux, L. et al., "Asymmetric Boron–Catalyzed Reactions", *Chem. Rev.*, 93: 763–784 (1993).

Enders, D. et al., "Asymmetric Epoxidation of Enones With Oxygen in the Presence of Diethylzinc and (R,R)–N–Methylpseudoepherdine", *Angew. Chem. Int. Ed. Eng.*, 35(15): 1725–1726 (1996).

Falborg, L. et al., "Asymmetric Titanium–Catalysed Michael Addition of O–benzylhydroxylamine to α,β–unsaturated Carbonyl Compounds: Synthesis of β–amino acid precursors", *J. Chem.Soc., Perkin Trans.*, 1: 2823–2826 (1996).

Han, et al., "Wholly Aromatic Thermotropic Liquid Crystalline Polyesters of 4,4'–Biphenol, Substituted Biphenols, and 1,1'–Binaphthyl–4,4'–diol with 3,4'–Benzophenone Dicarboxylic Acid", *J. Polym. Sci. Part A: Polym. Chem.*, 33: 211–225 (1995).

Hu, Q. et al., "Conjugated Polymers with Main Chain Chirality. 1. Synthesis of an Optically Active Poly(arylenevinylene)", *Macromolecules*, 29: 1082–1084 (Jan. 29, 1996).

(List continued on next page.)

*Primary Examiner*—Duc Truong
*Attorney, Agent, or Firm*—Merchant & Gould P.C.

[57] ABSTRACT

A chiral biphenyl compound includes a hindered 2,2'-substituted-1,1'-biphenyl subunit and has the following formula:

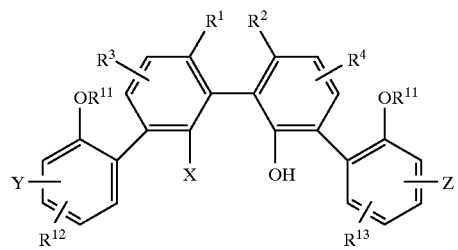

The chiral biphenyl compounds have been shown to be useful as catalysts in asymmetric reactions. For example, an organozinc species can be formed by reacting the chiral biphenyl compound with an organozinc compound, $R^{14}R^{15}Zn$ and then used as a catalyst for the asymmetric alkylation of an aldehyde by an organozinc compound.

26 Claims, No Drawings

PUBLICATIONS

Hu, Q. et al., "Conjugated Polymers with Main Chain Chirality. 2. Synthesis of Optically Active Polyarylenes", *Macromolecules*, 29: 5075–5082 (Jul. 15, 1996).

Hu, Q. et al., "Poly (1,1'–bi–2–naphthol)s: Synthesis, Characterization, and Application in Lewis Acid Catalysis", *J. Org. Chem*, 61(24): 8370–8377 (Nov. 29, 1996).

Hu, Q. et al., "The First Optically Active and Sterically Regular Poly (1,1'–bi–2–naphthol)s: Precursors to a New Generation of Polymeric Catalysts", *The Journal of Organic Chemistry*, vol. 61(16): 5200–5201 (Aug. 9, 1996).

Hu, Q. et al., "An Efficient and Practical Direct Resolution of Racemic 1,1'–Bi–2–naphthol to Both of Its Pure Enantiomers", *Tetrahedron: Asymmetry*, 6(9): 2123–2126 (1995).

Hu, Q. et al., "Synthesis of A 1,1'–Binaphthyl Based Main Chain Chiral Conjugated Polymer", *Mat. Res. Soc. Symp. Proc.*, 413: 621–626 (1996).

Huang, W. et al., "Development of Highly Enantioselective Polymeric Catalysts Using Rigid and Sterically Regular Chiral Polybinaphthols", *J. Am. Chem. Soc.*, 119: 4313–4314 (May 7, 1997).

Huber, et al., "A Soluble Poly(para–phenylene) Composed of Cyclophane Units: Poly[2,5–(oxygecanoxy)–1,4–phenylene]", *Macromol. Rapid Commun.*, 15: 897–902 (1994).

Itsuno, S. et al., "New Solid–Phase Catalysts for Asymmetric Synthesis: Cross–Linked Polymers Containing a Chiral Shiff Base–Zinc Complex", *J. Org. Chem.*, 55(1): 304–310 (1990).

Itsuno, S. et al., "Polymer–Supported Poly(amino acids) as New Asymmetric Epoxidation Catalyst of $\alpha,\beta$–Unsaturated Ketones", *J. Org. Chem.*, 55: 6047–6049 (1990).

Kitajima, H. et al., "Enantioselective Addition of Diethylzinc to Aldehydes Using 1,1'–Bi–2–naphthol–3,3'–dicarboxamide as a Chiral Auxillary", *Chemistry Letters*: 343–344 (1996).

Kitajima, H. et al., N,N,N',N',–Tetraalkyl–2,2–dihydroxy–1,1'–binaphthyl–3,3'–dicarboxamides: Novel Chiral Auxiliaries for Asymmetric Simmons–Smith Cyclopropanation of Allylic Alcohols and for Asymmetric Diethylzinc Addition to Aldehydes 11: *Bull. Chem. Soc. Jpn.*, 70: 207–217 (1997).

Kawakami, Y. et al., "An Asymmetric Synthesis of 2,4–Dimethylvalerolactone and Mevalonolactone using Chiral Binaphthyldiamine Derivatives", *J. Chem. Soc., Chem. Commun*: 779–781 (1984).

Kroutil, W. et al., "Unexpected Asymmetric Epoxidation Reactions Catalysed by Polyleucine–Based Systems", *Chem. Commun.*: 845–846 (1996).

Liou, et al., "Preparation and Properties of Aromatic Polyimides from 2,2'–Bis(p–aminophenoxy)biphenyl or 2,2'–Bis(p –aminophenoxy)–1,1'–binaphthyl and Aromatic Tetracarboxylic Dianhydrides", *J. Polym. Sci. Part A: Polym. Chem.*, 31: 3273–3279 (1993).

Ma, L. et al., "A New Class of Chiral Conjugated Polymers with a Propeller–Like Structure", *Macromolecules*, 30(2): 204–218 (Jan. 27, 1997).

Ma, L. et al., "Chiral Conjugated Propeller Polymers", *Polymer Preprints*, 37(2): 462–463 (Aug. 1996).

Ma, L. et al., "Conjugated Polymers with Main Chain Chirality. 3. Synthesis of Optically Active Poly(aryleneethnylene)s", *Macromolecules*, 29(15): 5083–5090 (Jul. 15, 1996).

Ma, L. et al., "Synthesis of an Optically Active Poly(aryleneethynylene) Containing Extended Conjugation in the Repeat Unit" *Tetrahedron: Asymmetry*, 7(11): 3103–3106 (Nov. 1996).

Mi, et al., "Optically Active Aromatic Polyimides Having Axially Dissymmetric 1,1'–Binaphthalene–2,2'–diyl Units", *Macromolecules*, 29(17): 5758–5759 (1996).

Mislow, K. et al., "Absolute Configuration of 1,1'–Bi–2–naphthylamine", *J. Org. Chem.*, 23: 2027–2028 (Dec. 1958).

Miyano, S. et al., "Axially Dissymmetric Bis(aminophosphine)s Derived from 2,2'–Diamino–1,1'–binaphthyl. Synthesis and Application to Rhodium(I)–Catalyzed Asymmetric Hydrogenations", *Bull. Chem. Soc. Jpn*, 57: 2171–2176 (1984).

Miyaura, et al., "The Palladium–Catalyzed Cross–Coupling Reaction of Phenylboronic Acid with Haloarenes in the Presence of Bases", *Synthetic Communications*, 11(7): 513–519 (1981).

Nakano, et al., "Toward Control of Stereochemistry in GTP by a Rational Monomer Design. Cyclopolymerization of 2,2'–Bis((methacryloyloxy)methyl)–1,1'–binaphthyl", *J. Am. Chem. Soc.*, 117(1): 534–535 (1995).

Neidlein, et al., "Selective Complexation of Disaccharides by a Novel $D_2$–symmetrical Receptor in Protic Solvent Mixtures", *Chem. Commun.*: 1493–1494 (1996).

Noyori, et al., "Enantioselective Addition of Organometallic Reagents to Carbonyl Compounds: Chirality Transfer, Multiplication, and Amplification", *Angew. Chem. Int. Ed. Engl.*, 30, 49–69 (1991).

Noyori, et al., "Enantioselective Alkylation Of Carbonyl Compounds. From Stoichiometric To Catalytic Asymmetric Induction", *Pure & Appl. Chem.*, 60(11): 1597–1606 (1988).

O'Connor, M. et al., "Diastereoisomeric Four–Coordinate Complexes. V. Pseudo–Tetrahedral Complexes of Controlled Absolute Configuration. Configurational Interconversion of Nickel (II) Complexes without Racemization", *Journal of the American Chemical Society*: 90(17): 4561–4568 (Aug. 14, 1968).

Percec, et al., "Soluble Polyarylenes Containing Alternating Binaphthylene and Biphenylene Structural Units", *J. Polym. Sci. Part A: Polym. Chem.*, 30: 1037–1049 (1992).

Percec, et al., "Synthesis and Ni(0)–Catalyzed Polymerization of 2,5–Bis(4–chloro–1–naphthyl)biphenyl", *J. Polym. Sci. Part A: Polym. Chem.*, 31: 1087–1091 (1993).

Pertici, P. et al., "Synthesis, Chiroopitcal Properties and Catalytic Activity_–Rhodium (I) and –iridium (I) Cationic Complexes Containing Binaphthyl, $C_2$–symmetric Diamine Ligands", *J. Org. Chem.*, 515: 163–171 (1996).

Pradellok, et al., "Bis(6–bromo–2–hydroxy–1–naphthyl)", *Chem. Abstr.*, Abstract 90: 121289t (1979).

Prasad, et al., "$C_2$–Symmetric Chiral Zinc Alkoxides as Catalysts for the Enantioselective Addition of Diethylzinc to Aryl Aldehydes", *Tetrahedron: Asymmet*, 7(7): 1957–1960 (1996).

Pu, L., "The AsymmetricReaction of Aldehydes with Dialkylzincs Catalyzed by Polybinaphthols", Worldwide Conference, Chira Tech '97, Philadelphia, Pennsylvania: 11 pages (Nov. 11–13, 1997).

Pu, L., "The Study of Chiral Conjugated Polymers", *Acta Polymer*, 48: 116–141 (Apr. 1997).

Puts, et al., "The First Report of Cyclopolymerization of Bis(oxazolines) To Give Optically Active Polymacrocycles", *Macromolecules*, 28: 390–392 (1995).

Qian, et al., "Chiral Molecular Recognition in Polymer Langmuir–Blodgett Films Containing Axially Chiral Binaphthyl Groups", *J. Am. Chem. Soc.*, 115(13): 5624–5628 (1993).

Sakane, S., et al., "Asymmetric Cyclization of Unsaturated Aldehydes Catalyzed by a Chiral Lewis Acid", *Tetrahedron Letters*, 26(45): 5535–5538 (1985).

Sanchez, M. et al., "Enantiocomplementary Asymmetric Epoxidation of Selected Enones using Poly–L–leucine and Poly–D–leucine", *J. Chem. Soc. Perkin Trans*: 1467–1468 (1995).

Seebach, et al., "146, Polymer– and Dendrimer–Bound Ti–TADDOLates in Catalytic (and Stoichiometric) Enantioselective Reactions: Are Pentacoordinate Cationic Ti Complexes the Catalytically Active Species?", *Helvetica Chimica Acta*, 79: 1710–1740 (1996).

Sepulchre, M. et al., "The Use of Atropoisomeric Chiral Initiators in the Polymerization of Heterocyclic Monomers: An Example of Almost Ideal Stereoelection in the Case of Methylthiirane", *Makromol. Chem., Rapid Commun.*, 2: 261–266 (1981).

Singh, V., "Practical and Useful Methods for the Enantioselective Reduction of Unsymmetrical Ketones", *Synthesis*: 605–617 (Jul. 1992).

Slides presented at Gordon Research Conference, New England College, Henniker, New Hampshire (Jun. 25–30, 1995).

Slides presented at Materials Research Society, 1995 Fall meeting, Boston, Mass. (Nov. 27–Dec. 1, 1995).

Smrcina, M. et al., "Synthesis of Enantiomerically Pure 2,2'–Dihydroxy–1,1'–binaphythyl, 2,2'–Diamino–1,1'–binaphthyl, and 2–Amino–2'–hydroxy–1,1'–binaphthyl. Comparison of Processes Operating as Diastereoselective Crystallization and as Second–Order Asymmetric Transformation", *J. Org. Chem.*, 57: 1917–1919 (1992).

Soai, et al., "Enantioselective Addition of Organozinc Reagents to Aldehydes", *Chem. Rev.*, 92(5): 833–856 (1992).

Sogah, et al., "Host–Guest Complexation. 14. Host Covalently Bound to Polystyrene Resin for Chromatographic Resolution of Enantiomers of Amino Acid and Ester Salts[1,2]", *J. Amer. Chem. Soc.*, 101(11): 3035–3042 (May 231979).

Suzuki, "Organoborates in New Synthetic Reactions", *Acc. Chem. Res.*, 15: 178–184 (1982).

Tamai, et al., "Synthesis of Optically Active Polyamides Having Axially Dissymmetric 1,1'–Binaphthalene–2,2'–dicarboxylic Acid Component and Their Optical Resolution Ability as Chiral Adsorbent for HPLC", *Bull. Chem. Soc. Jpn.*, 64(7): 2260–2265 (1991).

Vitharana, et al., "An Optically Active Polybinaphthyl. Nickel(0)–Mediated Polymerization of 6,6'–Dibromo–2,2'–dihexyloxy–1,1'–binaphthyl", *Polymer Preprints*, 37: 855–856 (1996).

Wallow, et al., "In Aqua Synthesis of Water–Soluble Poly(p–phenylene) Derivaties" in "Communications to the Editor", *J. Am. Chem. Soc.*, 113: 7411–7412 (1991).

Widhalm, M. et al., "Macrocyclic Diphosphine Ligands in Asymmetric Carbon—Carbon Bonding–Forming Reactions", *J. Organometallic Chem.*, 523: 167–178 (1996).

CHIRAL BIPHENYL COMPOUNDS FOR USE IN ASYMMETRIC REACTIONS

This is a continuation-in-part of U.S. patent application Ser. No. 08/756,748 filed on Nov. 26, 1996, herein incorporated by reference, now abandoned.

GOVERNMENT SUPPORT

This invention was made with government support under grant No. F 49620-96-1-0360 by the U.S. Department of Defense. The government has certain rights in the invention.

BACKGROUND OF THE INVENTION

Catalysts are an important component for many chemical reactions as they typically increase the rate of the reaction. They may also inhibit the formation of competing products as there is less time for significant product formation by competing reactions. Beyond improving reaction rate and enhancing product yield, catalysts may also provide an enantioselective mechanism for obtaining an optically active product. Often an enantioselective catalyst is itself chiral and optically active. There is a need for the development of enantioselective catalysts to catalyze reactions resulting in optically active products. Many naturally occurring and biologically active molecules are optically active and many reaction mechanisms, especially biological reactions, only function with compounds having a specific enantiomeric configuration.

Chiral catalysts have been used in a wide variety of reactions. One such reaction is the enantioselective alkylation of an aldehyde with an organozinc reagent to produce an optically active secondary alcohol. These optically active alcohols are components of many naturally occurring and biologically active compounds, as well as materials such as liquid crystals. Optically active alcohols are also important as synthetic intermediates of various functionalities such as halide, amine, ester, ether, etc.

Organozinc compounds have proven useful in the formation of optically active secondary alcohols. However, the simple addition of an organozinc compound to an aldehyde does not typically produce an optically active alcohol since the starting aldehyde and organozinc compound are often not optically active. In addition, the reaction of an organozinc compound, especially a dialkylzinc compound, with an aldehyde is often very slow and results in side reactions such as reduction. Chiral catalysts are useful in this reaction to increase the reaction rate, reduce the amount of side reaction products, and provide chiral centers that increase the enantioselectivity of the reaction.

There have been many chiral catalysts developed for use in this reaction. See reviews by Soai, et al., *Chem. Rev.*, 92, 833 (1992) and Noyori, et al., *Angew. Chem. Int. Ed. Engl.*, 30, 49 (1991). However, many of these catalysts are useful only in reactions with a specific type of substrate (e.g., aliphatic aldehydes or aromatic aldehydes). There is a need for the development of additional catalysts and, in particular, catalysts which can be used with a broad spectrum of substrates.

SUMMARY OF THE INVENTION

The present invention is directed to organozinc species having chiral 2,2'-substituted biphenyl subunits and their use in catalyzing the reaction of an organozinc compound with an aldehyde to form an alcohol. One embodiment of the organozinc species includes a reaction product of a) a biphenyl compound having a plurality of hindered 2,2'-substituted 1,1'-biphenyl subunits and b) an organozinc compound, $R^{14}R^{15}Zn$, where $R^{14}$ and $R^{15}$ are independently substituted or unsubstituted alkyl, alkenyl, alkynyl, aryl, aralkyl, or benzoyl groups. Alternatively, $R^{14}$ may be a trialkylsilyl- or triarylsilyl-substituted alkyl group. The biphenyl compound has the formula:

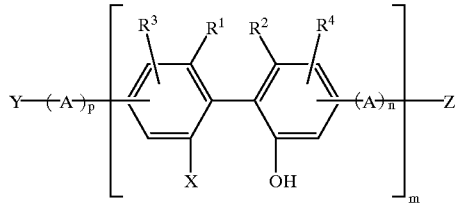

where n is 0 or 1, p is 0 or 1, A is a rigid subunit, and m is an integer greater than 3. Y and Z are end groups and may be independently H, Cl, Br, I, $B(OH)_2$, or substituted or unsubstituted aryl or aralkyl groups. X is $—OR^{18}$, $—NR^{19}R^{20}$, or $—SR^{21}$ where $R^{18}$, $R^{19}$, $R^{20}$, and $R^{21}$ are independently hydrogen, alkyl, cycloalkyl, aryl, or aralkyl. $R^1$ and $R^2$ are hindering groups which in combination provide sufficient hindrance to internal rotation such that the 2,2'-substituted biphenyl subunits have an enantiomeric interconversion rate of no more than about 1% per hour at 100° C. $R^3$ and $R^4$ are independently hydrogen, alkyl, alkoxy, alkynyl, aryl, aralkyl, vinyl, trialkylsilyl, triarylsilyl, $—CONR^5R^6$, $—CO_2R^7$, $—SO_2R^8$, $—NR^9R^{10}$, or halogen, where $R^5$, $R^6$, $R^7$, $R^8$, $R^9$ and $R^{10}$ are independently alkyl, aralkyl or aryl. Alternatively, $R^1$ and $R^3$ form a substituted or unsubstituted first fused ring and/or $R^2$ and $R^4$ form a substituted or unsubstituted second fused ring.

Another embodiment of the organozinc species includes a reaction product of a) a biphenyl compound having one or more hindered 2,2'-substituted 1,1'-biphenyl subunits and b) an organozinc compound, $R^{14}R^{15}Zn$, where $R^{14}$ and $R^{15}$ are independently substituted or unsubstituted alkyl, alkenyl, alkynyl, aryl, aralkyl, or benzoyl groups. Alternatively, $R^{14}$ may be a trialkylsilyl- or triarylsilyl-substituted alkyl group. In this embodiment, the biphenyl compound has the formula:

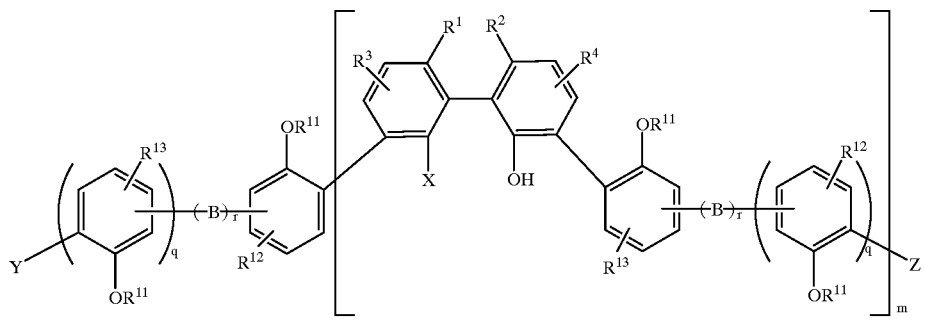

where m is an integer greater than 0, q is 0 or 1, r is 0 or 1, B is a rigid subunit, and $R^{12}$ and $R^{13}$ are independently hydrogen, halogen, alkyl, cycloalkyl, alkoxy, cycloalkoxy, aryl, trialkylsilyl, triarylsilyl, or aralkyl. Y and Z are end groups and may be independently H, Cl, Br, I, $B(OH)_2$, or substituted or unsubstituted aryl or aralkyl groups. X is —$OR^{18}$, —$NR^{19}R^{20}$, or —$SR^{21}$ where $R^{18}$, $R^{19}$, $R^{20}$, and $R^{21}$ are independently hydrogen, alkyl, cycloalkyl, aryl, or aralkyl. $R^1$ and $R^2$ are hindering groups which, in combination, provide sufficient hindrance to internal rotation such that the 2,2'-substituted biphenyl subunits have an enantiomeric interconversion rate of no more than about 1% per hour at 100° C. $R^3$ and $R^4$ are independently hydrogen, alkyl, alkoxy, alkynyl, aryl, aralkyl, vinyl, trialkylsilyl, triarylsilyl, —$CONR^5R^6$, —$CO_2R^7$, —$SO_2R^8$, —$NR^9R^{10}$, or halogen, wherein $R^5$, $R^6$, $R^7$, $R^8$, $R^9$ and $R^{10}$ are independently alkyl, aralkyl or aryl. Alternatively, $R^1$ and $R^3$ form a substituted or unsubstituted first fused ring and/or $R^2$ and $R^4$ form a substituted or unsubstituted second fused ring. $R^{11}$ is hydrogen, alkyl, or cycloalkyl.

Another embodiment of the invention is a method for producing an alcohol which includes reacting an aldehyde with an organozinc compound in the presence of either of the organozinc species described above.

DETAILED DESCRIPTION OF THE INVENTION

The biphenyl compound described herein may be used to form an organozinc species. This organozinc species can catalyze the alkylation of an aldehyde by an organozinc compound to form a secondary alcohol. An optically active biphenyl compound may be used to form an optically active organozinc species which may catalyze the alkylation of an aldehyde to generate an optically active secondary alcohol. A preferred organozinc species for this reaction includes the reaction product of an organozinc compound with a polymeric biphenyl compound having hindered 2,2'-substituted 1,1'-biphenyl subunits.

Structure and Formation of Biphenyl Compounds

Compounds having the formula 1 are examples of suitable biphenyl compounds for use in the present invention.

The number of 2,2'-substituted biphenyl subunits in the polymeric biphenyl compound varies and typically includes at least 4, but no more than about 200 biphenyl subunits. Preferably, the polymeric biphenyl compound has about 5 to about 50 biphenyl subunits. The 2,2'-substituted biphenyl subunits may be coupled directly together (i.e., n=0) or may be linked by a rigid subunit, A (i.e., n=1), which acts as a spacer between the 2,2'-substituted biphenyl subunits.

Y and Z are end groups and may be independently H, Cl, Br, I, $B(OH)_2$, or substituted or unsubstituted aryl or aralkyl groups and p can be 0 or 1. X is —$OR^{18}$, —$NR^{19}R^{20}$, or —$SR^{21}$ where $R^{18}$, $R^{19}$, $R^{20}$, and $R^{21}$ are independently hydrogen, alkyl, cycloalkyl, aryl, or aralkyl. Preferably, $R^{18}$ is hydrogen or C(1–6) alkyl. Preferably, $R^{19}$, $R^{20}$, and $R^{21}$ are C(1–8) alkyl. In some embodiments, $R^{19}$ is methyl and $R^{20}$ is C(3–8) alkyl.

$R^3$ and $R^4$ are substituents attached to the phenyl rings of the 2,2'-substituted biphenyl subunit and are functional groups that do not substantially compete with the phenolic hydroxy groups at the 2 and/or 2'positions for the complexation of the zinc cation of the organozinc compound. For example, $R^3$ and $R^4$ can independently be hydrogen, alkyl, alkoxy, alkynyl, aryl, aralkyl, vinyl, trialkylsilyl, triarylsilyl, halogen, —$CONR^5R^6$, —$CO_2R^7$, —$SO_2R^8$, or —$NR^9R^{10}$ where $R^5$, $R^6$, $R^7$, $R^8$, $R^9$ and $R^{10}$ are independently alkyl, aralkyl or aryl.

Alternatively, $R^1$ and $R^3$ and/or $R^2$ and $R^4$ can form a fused ring with the phenyl group to which they are attached. The fused ring may optionally be substituted with one or more substituents. Suitable substituents include alkyl, alkoxy, aryl, aralkyl, —$CONR^5R^6$, —$CO_2R^7$, —$SO_2R^8$, alkynyl, vinyl, trialkylsilyl, triarylsilyl, halogen or —$NR^9R^{10}$ where $R^5$, $R^6$, $R^7$, $R^8$, $R^9$, and $R^{10}$ are independently substituted or unsubstituted alkyl, aralkyl or aryl.

Typically, alkyl, alkenyl, alkynyl, and alkoxy groups are C(1–20) groups and aryl and aralkyl are C(4–50), and preferably C(6–18), groups unless otherwise indicated. A 'substituted' functional group (e.g., alkyl, aryl, aralkyl, alkenyl, or alkynyl groups) may include substituents such as halogen, alkoxy, trialkylsilyl, triarylsilyl, —NRR', —$CO_2R$, and —CONRR' where each R and R' group is independently alkyl, aryl, or aralkyl. Unless otherwise noted, the term 'alkyl' includes both alkyl and cycloalkyl groups. In addition, unless otherwise noted, the term 'alkoxy' includes both alkoxy and cycloalkoxy groups.

$R^1$ and $R^2$ are hindering groups which make the 2,2'-substituted biphenyl subunits chiral. The chirality of the 2,2'-substituted biphenyl subunits results from the hindered internal rotation of the two phenyl rings. Internal rotation refers to the relative rotation of two portions of a molecule with respect to each other about an axis which corresponds to a chemical bond between the two portions. In the case of the 2,2'-substituted biphenyl subunit, the internal rotation of interest is the relative rotation of the phenyl rings with respect to each other around an axis corresponding to the bond between the two phenyl rings (i.e., the 1,1' bond).

The potential energy due to steric interactions between two portions of a molecule that are rotating with respect to each other is a function of the relative angle between the two portions. This interaction energy is the sum of the Van der Waals and electrostatic interactions between atoms of one rotating portion and atoms of the other portion. The Van der Waals interactions are always repulsive but the electrostatic interactions may be either attractive or repulsive. Generally, the strength of these interactions is dependent on the distance between the atoms. In typical molecules, as the rotating portions get closer together, the interaction energy increases.

In the case of the 2,2'-substituted biphenyl subunit, when the two phenyl rings, both of which are essentially planar structures, achieve an approximately coplanar configuration the interaction energy between the two phenyl rings reaches a maximum because the atoms of the two phenyl rings are, overall, closer to each other than in any other configuration. On the other hand, when the two phenyl rings are at approximately right angles to each other, the interaction energy is at a minimum as the groups are further apart than at any other time during a rotation. A full 360° rotation has two maxima, corresponding to the two approximately coplanar configurations, and two minima, corresponding to the two approximately orthogonal configurations.

The difference between the maximum and minimum energies (or more correctly the difference between the molecular energy levels closest to the maximum and minimum energies) is the activation energy required by the molecule for internal rotation. There will be relatively free rotation about the internal rotation axis when the activation energy is small compared to kT, where k is Boltzmann's constant and T is the temperature in Kelvin. When the activation energy is near kT, some of the molecules will have energy to overcome the activation barrier and will rotate, the rest will be hindered from rotation until they receive more energy from sources such as thermal heating. The number of molecules at any given point in time having sufficient energy to overcome the activation barrier is determined from Maxwell-Boltzmann statistics. When the activation energy is much greater than kT the molecules will not have sufficient energy to rotate and will therefore be effectively hindered.

The phenyl rings of unsubstituted biphenyl freely rotate at room temperature. However, the addition of hindering groups on one or more of the phenyl rings can increase the activation energy for internal rotation and significantly hinder internal rotation about the 1,1' bond at room temperature. The $R^1$ and $R^2$ substituents are chosen to hinder the internal rotation of the 2,2'-substituted biphenyl subunits. Functional groups as small as methyl groups can hinder the internal rotation of the biphenyl subunit.

When the biphenyl compound is reacted with an organozinc compound to form an organozinc species, the phenolic (i.e., 2 and/or 2') hydroxy groups combine with the zinc compound to form an active catalytic site. Although other molecules of the zinc compound may bind or complex with the hindering groups, other substituents on the biphenyl rings, substituents on the rigid subunits, or functional groups in other parts of the biphenyl compound, these combinations should typically be less active towards reactants in the reaction to be catalyzed (e.g., the alkylation of an aldehyde).

Examples of suitable $R^1$ and $R^2$ groups include alkyl, alkoxy, aryl, aralkyl, —CONR$^5$R$^6$, —CO$_2$R$^7$, —SO$_2$R$^8$, alkynyl, vinyl, —NR$^9$R$^{10}$, trialkylsilyl, or triarylsilyl where $R^5$, $R^6$, $R^7$, $R^8$, $R^9$ and $R^{10}$ are independently alkyl, aralkyl, or aryl. Alternatively, as mentioned above, $R^1$ and $R^3$ and or $R^2$ and $R^4$, in combination with the phenyl ring to which they are attached, may form a substituted or unsubstituted fused ring. One example of a biphenyl compound with a fused ring structure is a binaphthyl compound 2 having 2,2'-substituted 1,1'-binaphthyl subunits and the formula:

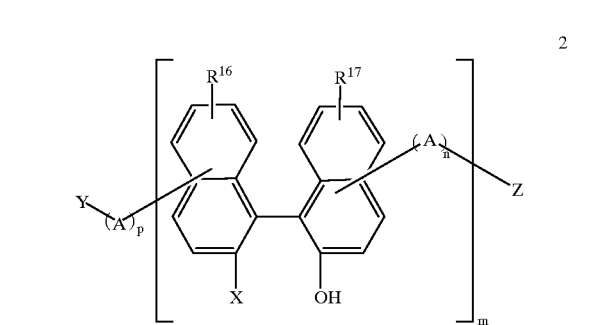

2 where $R^{16}$ and $R^{17}$ are independently alkyl, alkoxy, aryl, aralkyl, —CONR$^5$R$^6$, —CO$_2$R$^7$, —SO$_2$R$^8$, alkynyl, vinyl, trialkylsilyl, triarylsilyl, halogen, or —NR$^9$R$^{10}$, where $R^5$, $R^6$, $R^7$, $R^8$, $R^9$, and $R^{10}$ are independently alkyl, aralkyl, or aryl.

Binaphthyl compounds having formulas 3 and 4 illustrate specific examples of the biphenyl compounds of this invention. Optically active binaphthyl compounds 3 and 4 have shown enantioselective catalytic activity as demonstrated in the Examples, hereinbelow.

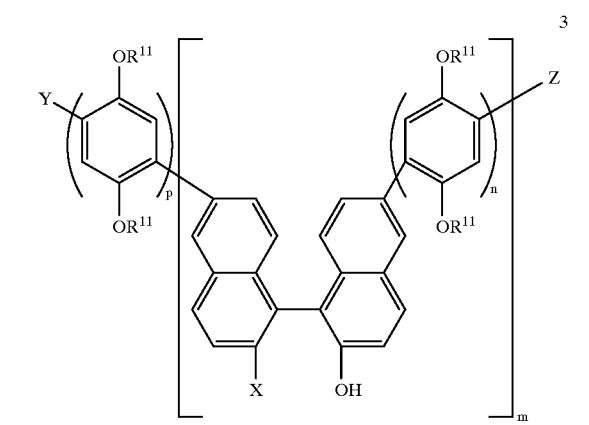

3

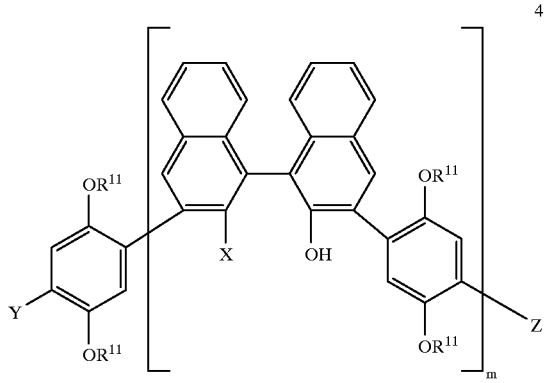

4

The $R^{11}$ group in the aromatic ether functionality of polymers 3 and 4 is typically hydrogen or a C(1–20) alkyl or cycloalkyl, and is preferably C(3–8) alkyl.

Hindering groups may also be placed at positions on the phenyl ring meta to the 1,1' bond. Such groups, however, must be substantially larger than a methyl group to ensure adequate steric hindrance because they are positioned further away from the other phenyl ring.

A hindered 2,2'-substituted biphenyl subunit is usually chiral. The two configurations of the hindered 2,2'-substituted biphenyl subunits associated with the two potential energy minima are enantiomers. Hindered molecules with an activation energy much greater than kT are considered chiral because they remain in one enantiomeric configuration. In contrast, unhindered (i.e., freely rotating) molecules should not be considered chiral as there will be rapid interconversion from one enantiomeric configuration to the other. Less rapid interconversion will occur when the activation energy of the internal rotation is near kT because only a portion of the molecules will have energy to rotate between the enantiomeric configurations. Although these molecules are chiral, an initially optically active sample will show a decrease in optical activity over time as molecules within the sample interconvert to the other enantiomer. This interconversion process leads to the racemization of the compound.

One measure of the hindering effect of $R^1$ and $R^2$ is the amount of optical activity lost over time. For the purposes of this application, the enantiomeric interconversion rate is defined as the percentage loss of optical activity per hour at a specific temperature. The enantiomeric interconversion rate of an optically active biphenyl compound is especially important when the desired product is optically active. An optically active product typically can not be synthesized in high yields and with high enantiomeric excess if there is significant racemization of the biphenyl subunits during the reaction as there will be fewer biphenyl subunits having the correct enantiomeric configuration for production of the optically active product. Thus, the most useful biphenyl compounds will have interconversion rates which have little loss in optical activity over the duration of the reaction to be catalyzed. The biphenyl compounds of the invention typically have an enantiomeric interconversion rate of less than about 1% per hour at 50° C. Preferably, the biphenyl compounds have an enantiomeric interconversion rate of less than about 1% per hour at 100° C.

A biphenyl compound with a majority of the hindered 2,2'-substituted biphenyl subunits having the same enantiomeric configuration is optically active. These optically active compounds may be useful in producing optically active products by mechanisms such as asymmetric induction. The biphenyl compound may have an enantiospecific structure which limits the geometry of the reactants, in the presence of an organozinc species made from the biphenyl compound, so that predominantly one enantiomer of the product is obtained. The enantiospecific structure of the biphenyl compound may result from, for example, steric hindrance of other possible reaction geometries by portions of the biphenyl compound (e.g., the rigid subunit, A, and/or substituents on the phenyl rings of the 2,2'-substituted biphenyl subunits). In some embodiments, a quantity of a biphenyl compound is optically active and has at least about 10% of the 2,2'-substituted biphenyl subunits, preferably at least about 50%, more preferably at least about 75%, and most preferably at least about 95% of the 2,2'-substituted biphenyl subunits with the same enantiomeric configuration.

Another important part of the biphenyl compound is the phenolic hydroxy group(s) at the 2 and/or 2' positions. The hydroxy group(s) provide a site for binding, either covalently or coordinatively, with metal cations or complexes. Although no particular theory is necessary to the invention, it is believed that the hydroxy group(s) of the biphenyl compound complex with the organozinc compound to form the organozinc species. It is thought that this provides a catalytically active site. Other substituents of the biphenyl compound may coordinatively complex with an organozinc compound which is also complexed with one or both of the phenolic (i.e., 2,2') hydroxy group(s). For example, the ether oxygens on the rigid subunits, A, of binaphthyl compound 4 may provide sites for complexation with a metal cation such as zinc that is also complexed with one or more naphtholic hydroxy groups. Such coordinative complexation may provide a geometry which enhances an enantioselective catalytic-activity of the biphenyl compound.

A preferred biphenyl compound with ether oxygens on the rigid subunit for the complexation with a metal cation or atom complexed with one or more of the groups at the 2 and/or 2' positions has formula 5:

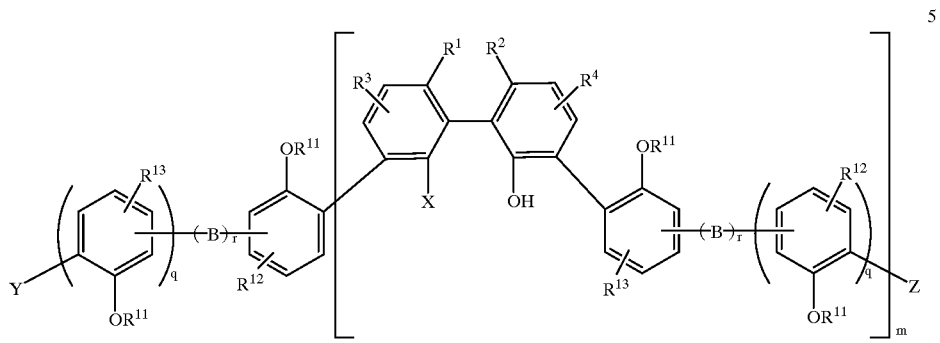

where q is 0 or 1, r is 0 or 1, B is a rigid subunit (similar to the rigid subunit, A) which has a backbone including one or more cycloalkyl, alkenyl, alkynyl, aryl, aralkyl, or heterocyclic groups or combinations thereof, $R^{11}$ is hydrogen or a C(1–20) alkyl or cycloalkyl, and $R^{12}$ and $R^{13}$ are independently hydrogen, halogen, C(1–20) alkyl or cycloalkyl, C(1–20) alkoxy or cycloalkoxy, trialkylsilyl, or triarylsilyl. Preferably, X is OH, $R^{11}$ is C(3–8) alkyl and B is a substituted or unsubstituted phenyl, heterocycle, or alkynyl group. Compound 5 may be a monomer (m=1) or a polymer (m>1).

The binaphthyl compound 6 is an illustration of a preferred compound for formation of the organozinc species.

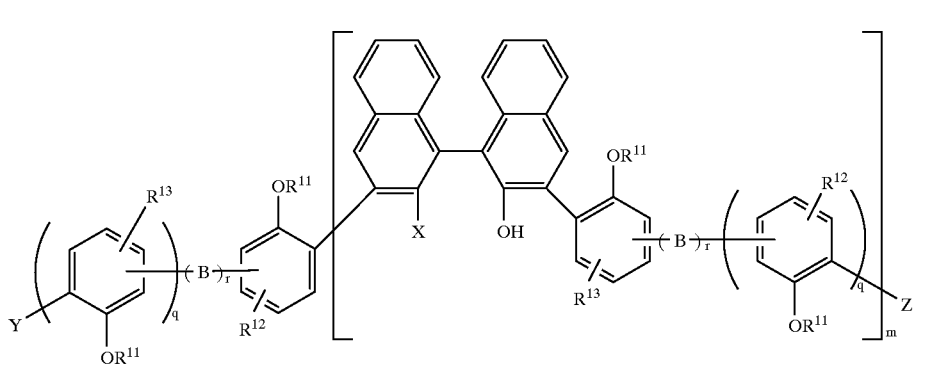

The biphenyl compound may include a rigid subunit, A and/or B. The rigid subunit may provide a needed geometry to hinder the formation of side products or undesired enantiomers through steric hindrance of unwanted reaction geometries. In polymeric biphenyl compounds, the rigid subunit may separate the 2,2'-substituted biphenyl subunits. The rigid subunit should be sufficiently rigid to provide a rigid backbone support for the polymeric biphenyl compound.

Suitable rigid subunits have a backbone including one or more cycloalkyl, alkenyl, alkynyl, aryl, aralkyl, or heterocyclic groups or combinations thereof. Specific examples include acetylene, phenylene, thiophene, adamantane, cubane, or rigid subunits with the following structures:

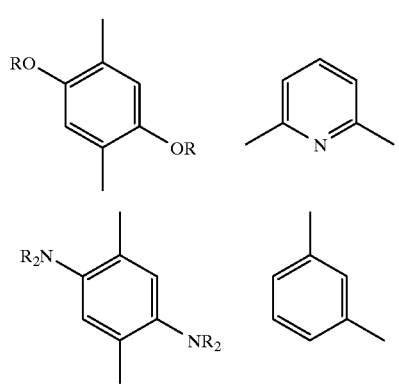

Suitable rigid subunits may also include a combination of the groups mentioned above, for example, biphenylene, triphenylene, and the structures illustrated below:

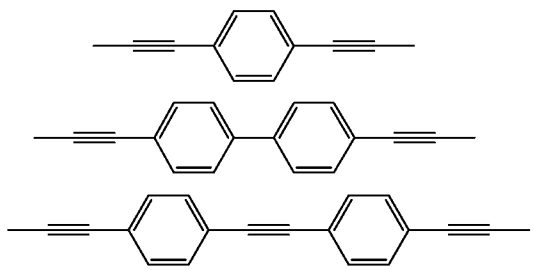

In addition, the backbone groups of the rigid subunits may have substituents such as halogen, alkoxy, —NRR', —CO$_2$R, —CONRR', or NO$_2$ where R and R' are independently alkyl, aryl, or aralkyl groups. Further examples of appropriate rigid subunits may be found in Hu, et al., *Macromolecules*, 29, 1082 (1996); Hu, et al., *Macromolecules*, 29, 5075 (1996); and Ma, et al., *Macromolecules*, 29, 5083 (1996), the disclosures of which are incorporated herein by reference.

Polymeric binaphthol (X=OH) compounds can be synthesized from 1,1'-bi-2-naphthol. For example, polybinaphthol 3 is a polymer with linkages at the 6 and 6' positions of the binaphthol subunit. This polymer is herein referred to as a 6,6'-linked polybinaphthol. Polybinaphthol 4 has linkages at the 3 and 3' positions and is referred to as a 3,3'-linked polybinaphthol. Other polybinaphthols may have symmetric linkage points at other positions such as 4 and 4'. Still other polymers may have asymmetric linkages such as, for example, at the 3 and 6' positions.

One method for making these polybinaphthols includes, first, halogenation of 1,1'-bi-2-naphthol at the sites at which the polymer is to be linked. To make polymer 3, the 6 and 6' sites of 1,1'-bi-2-naphthol are halogenated; to make polymer 4 the 3 and 3' sites are halogenated. Following halogenation, protecting groups are provided on any naphtholic hydroxyl groups. Suitable protecting groups include ethers, alkyls, esters, and crown ethers. Those skilled in the art are familiar with the use of protecting groups to protect hydroxyl moieties during reactions and they will therefore recognize that protecting groups other than those mentioned are suitable for this purpose.

For polymers without rigid subunits, A, the protected and halogenated binaphthol can then be polymerized in the presence of a nickel(0) or nickel(2) catalyst. Hu, et al., *J. Org. Chem.*, 61, 5200 (1996), incorporated herein by reference. Suitable nickel catalysts include NiCl$_2$ or (1,5-cyclooctadiene)$_2$Ni. A polymerization reaction catalyzed by NiCl$_2$ also typically requires the presence of excess zinc. The average molecular weight of the resulting polymer can be controlled to some extent by the amount of NiCl$_2$ catalyst used in the reaction. After polymerization, the hydroxyl protecting groups are then removed to give the polybinaphthol.

A polymer having rigid subunits, A, may be formed by a Suzuki coupling reaction (see Miyaura, et al., *Synth. Commun.*, 11, 513 (1981); Wallow, et al., *J. Am. Chem. Soc.*, 113, 7411 (1991); and Suzuki, *Acc. Chem. Res.*, 15, 179 (1982), the disclosures of which are herein incorporated by reference) between the halogenated and protected binaphthol and a spacer subunit which has boronic acid functional groups at the linkage sites. Alternatively, the polymer may be formed by, first, reacting the halogenated and protected polybinaphthol with magnesium followed by a trialkylborate and then hydrolysis to obtain a diboronic acid substituted binaphthol. Hu, et al., *Macromolecules*, 29, 1082 (1996) and Hu, et al., *Macromolecules*, 29, 5075 (1996), the disclosures of which are incorporated herein by reference. This compound is then Suzuki coupled with a spacer subunit which is halogenated at the linking positions to produce the polymer. The Suzuki coupling reaction in both instances takes place in the presence of a palladium catalyst and one or more phosphine ligands. Suitable phosphine ligands include triphenylphosphine and tritolylphosphine.

Monomer binaphthols may also be synthesized in this manner. In the case of a monomer, however, the rigid subunit, A, will typically have only functional group (e.g., diboronic acid or halogen group) that is capable of attachment to the protected binaphthol.

Polybinaphthols lacking a rigid subunit, A, can also be prepared by Suzuki coupling. This method includes the reaction of an approximately 1:1 mixture of halogenated binaphthol and diboronic acid substituted binaphthol to provide the polymer.

A different procedure can be used for adding rigid subunits with terminal alkynyl groups, i.e., rigid subunits having the following structure:

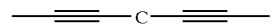

where C is the central portion of the rigid subunit and includes one or more suitable rigid subunit backbone groups such as cycloalkyl, alkenyl, alkynyl, aryl, or heterocyclic groups. In one method, the terminal alkyne subunit requires no substitution at the linkage sites. The alkyne subunit is reacted with a halogenated and hydroxyl-protected binaphthol in the presence of a palladium catalyst, phosphine ligands, and a copper compound, such as copper(I) halide or copper(II) acetate, to form a protected polybinaphthol. Ma, et al., *Macromolecules*, 29, 5083 (1996), incorporated herein by reference. This reaction is followed by removal of the hydroxyl protecting groups to give the desired polybinaphthol.

Alternatively, a halogenated and hydroxyl-protected binaphthol can be reacted with an alkyne in the presence of a palladium catalyst, phosphine ligands, and a copper compound, such as copper(I) halide or copper(II) acetate, to give a hydroxy-protected dialkynyl binaphthol. The protected polybinaphthol is then formed by a reaction of the hydroxy-protected dialkynyl binaphthol with a compound corresponding to the central portion of the spacer subunit, B, that has been halogenated at the linkage sites. This reaction is carried out in the presence of a palladium catalyst, phosphine ligands, and a copper compound, such as copper (I) halide or copper(II) acetate, and followed by removal of the hydroxyl protecting groups to give the desired polymer. Ma, et al., *Macromolecules*, 29, 5083 (1996).

Optically active polymers can be produced by starting with an optically active 1,1'-bi-2-naphthol. One method of resolving a 1,1'-bi-2-naphthol into optically active enantiomers involves a resolution procedure using (8S, 9R)-(-)-N-benzylcinchonidium chloride. Hu, et al., *Tetrahedron: Asymmetry*, 6, 2123 (1995), herein incorporated by reference. There is little enantiomeric conversion during the polymerization process described above so that relatively enantiomerically pure polymers can be obtained from pure optically active binaphthols.

If, instead, a mixture of different binaphthol enantiomers is used in the reaction then the enantiomers will be randomly distributed within the polymer. Optically active polymers may still be obtained from a starting material that is not enantiomerically pure, but there will be a consequent decrease in the optical activity of the polymer.

Other biphenyl compounds can be synthesized similarly by a proper choice of starting materials. For example, a polybinaphthyl with X=OCH$_3$ can be generated from starting material such as 2-hydroxy-2'-methoxy-1,1'-binaphthalene.

The Organozinc Species

The organozinc species is formed as the reaction product of a polymeric biphenyl compound having formula 1 and an organozinc compound. The organozinc compound is typically $R^{14}R^{15}Zn$, where $R^{14}$ and $R^{15}$ are independently alkyl, alkenyl, alkynyl, aryl, aralkyl, or benzoyl. Alternatively, $R^{14}$ may be a trialkylsilyl- or triarylsilyl-substituted alkyl group. Preferably, $R^{14}$ and $R^{15}$ are C(1–8) alkyl.

One method of making the organozinc species is to dissolve the organozinc compound, $R^{14}R^{15}$ Zn, and the biphenyl compound in a solvent. The reaction of the organozinc and biphenyl compound is typically conducted at a temperature between about –80° C. and about 50° C. and, preferably, between about 0° C. and 35° C.

The reacting step is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, toluene, diethyl ether, tetrahydrofuran, dichloromethane, chloroform, or 1,2-dichloroethane.

The reaction is typically conducted under an anhydrous atmosphere and in the absence of oxygen. Preferably, the reaction is conducted under a relatively inert atmosphere such as nitrogen or argon.

The ratio of biphenyl compound to organozinc compound may vary over a wide range. Typically the ratio of 2,2'-substituted biphenyl subunits to organozinc compound is at least about 1:0.9. If hydroxy groups are present at both the 2 and 2' positions then the ratio of 2,2'-substituted biphenyl subunits is preferably at least about 1:1.8, and more preferably at least about 1:2.0. Often the organozinc compound is added in excess, especially if the organozinc compound is also a reagent in the reaction. Substoichiometric amounts of the organozinc compound may be used if, for example, the organozinc compound might generate unwanted reaction products with the other reagents.

The size of the biphenyl compounds (e.g., the number of 2,2'-substituted biphenyl subunits) may have an impact on the suitability of an organozinc species. Organozinc species which include polymeric biphenyl compounds, especially those with 5 or more subunits, may have significantly different catalytic properties than species which contain the monomeric biphenyl compound. However, polymeric biphenyl compounds with a small number of monomer subunits may have properties similar to those of the monomer.

As more subunits are added to the polymeric biphenyl compound, the solubility of the compound decreases. Typically, the polymeric biphenyl compounds have less than about 200 biphenyl subunits. Preferably, the polymeric biphenyl compounds have between about 5 and about 50 biphenyl subunits and more preferably, the polymeric biphenyl compounds have between about 10 and about 30 biphenyl subunits. Soluble monomers and polymers are useful in homogeneous catalysis reactions. Insoluble monomers and polymers, as well as soluble monomers and polymers, may be used for heterogeneous catalysis.

Alkylation of an Aldehyde

A wide variety of reactants may be used in the reaction of an organozinc compound with an aldehyde to form an alcohol. Almost any aldehyde may be used. Suitable aldehydes include alkyl, aryl, aralkyl, vinyl, or alkynyl aldehydes, such as butyraldehyde, benzaldehyde, phenylacetaldehyde, and trans-cinnamaldehyde.

Many different organozinc compounds may be used in the reaction. In general, the organozinc compound has the formula $R_2Zn$. Suitable R groups include alkyl, alkenyl, alkynyl, alkoxide, aryl, aralkyl, furyl, or benzoyl. Specific examples include methyl, ethyl, propyl, iso-propyl, n-butyl, ethylene, phenyl, furyl, benzyl, and phenylalkynyl. The R groups of the organozinc compound include substituents like ester, alkoxide, acetal, trialkylsilyl, triarylsilyl, or other similar groups which are less reactive than the aldehyde functionality. This organozinc compound may be the same as the organozinc compound used to make the catalytic organozinc species.

Typically, the organozinc species is formed prior to addition of aldehyde. However, in some embodiments, the organozinc species may be generated simultaneously with the aldehyde alkylation.

The alkylation reaction is typically conducted at a temperature between about –100° C. and about 100° C. and, preferably, between about –80° C. and about 50° C. If the reaction is conducted at a temperature that is too low, the reaction will proceed very slowly. If the temperature is too high there may be an increase in the amount of side reaction products. In addition, high reaction temperatures may result in lower enantiomeric excesses for those reactions where the desired product is optically active.

The reacting step is typically carried out in an aprotic solvent which includes at least one of the following: a paraffin, a halogenated paraffin, benzene, a substituted benzene, or a saturated ether. The reacting step is preferably carried out in a solvent including at least one of the following: hexane, heptane, toluene, diethyl ether, tetrahydrofuran, dichloromethane, chloroform, or 1,2-dichloroethane.

The reaction is typically conducted under an anhydrous atmosphere and in the absence of oxygen. Preferably, the reaction is conducted under a relatively inert atmosphere such as nitrogen or argon.

In the reaction, the typical equivalent ratio of 2,2'-substituted biphenyl subunits to aldehyde is about 1:200 to about 1:2. Preferably, the ratio of 2,2'-substituted biphenyl subunits to aldehyde is about 1:100 to about 1:5. Large amounts of catalyst are usually unnecessary to speed the reaction and instead only increase the cost. Insufficient catalyst may lead to an increase in the amount of side products.

The following examples demonstrate the synthesis and uses of polymers of the invention. It is to be understood that these examples are merely illustrative and are in no way to be interpreted as limiting the scope of the invention.

EXAMPLES

In general, the binaphthol compounds of the Examples are generated from 1,1'-bi-2-naphthol which is commercially available (Aldrich). This compound can be resolved into optically pure enantiomers by the technique of Hu, et al., *Tetrahedron: Asymmetry*, 6, 2123 (1995).

Halogenation of 1,1'-bi-2-naphthol can be accomplished by the techniques discussed in Pradellok, et al., *Chem. Abstr.*, 90, 121289t (1979) (bromination); Sogah, et al., *J.*

Am. Chem. Soc., 101, 3035 (1979) (bromination); and Cox, et al., *Tetrahedron Lett.*, 33, 2253 (1992) (iodation); all of which are incorporated herein by reference.

The addition of protecting groups, such as acetate and methoxymethyl, to the naphtholic hydroxyl groups is accomplished by methods well known to those skilled in the art.

The synthesis of a rigid subunit precursor with boronic acid groups at the linking sites is accomplished according to the method described in Huber, et al., *Macromol. Rapid Commun.*, 897 (1994).

Example 1

Preparation of polymer 4 with binaphthol subunits having an (R) enantiomeric configuration and X=OH ((R)-3,3'-linked polybinaphthol with a p-dihexyloxybenzene spacer). To a mixture of methoxymethyl protected (R)-3,3'-diiodo-1,1'-bi-2-naphthol (7.32 g, 11.7 mmol), 2,5-di(boronic acid)-p-dihexyloxybenzene (4.3 g, 11.7 mmol), Ba(OH)$_2$·8H$_2$O (6.17 g, 36.0 mmol), Pd(OAc)$_2$ (0.134 g, 0.6 mmol), tris-o-tolylphosphine (0.365 g, 1.2 mmol) were added DMF (60 mL) and H$_2$O (10 mL). The whole mixture was refluxed for 42 h under nitrogen. EtOAc was then added and the organic layer was washed with H$_2$O and filtered. The filtrate was concentrated. The residue was redissolved in CH$_2$Cl$_2$ and precipitated from MeOH. This procedure was repeated three times. The precipitate was collected and dried under vacuum to give a methoxymethyl protected (R)-polymer of formula 4 as a yellow solid (7.0 g, 93%). [α]$_D$=−63.39° (c=0.50, THF). $^1$H NMR(CDCl$_3$, 400 MHz) δ 8.51 (s, low intensity), 7.93 (s, 2H), 7.86 (d, J=8.0 Hz, 2H), 7.77 (d, low intensity) 7.39·(m, 4H), 7.30 (m, 2H), 7.13 (br s, 2H), 7.0–7.5 (low intensity peaks were observed in this range due to the end groups), 4.54 (d, J=5.5 Hz, 2H), 4.50 (d, J=5.5 Hz, 2H), 3.95 (m, 4H), 2.44 (s, 6H), 1.65 (m, 4H), 1.25 (m, 4H), 1.17 (m, 8H), 0.74 (m, 6H). GPC (THF, polystyrene standards): Mw=5,900, Mn=3,900, PDI=1.53.

To a THF (30 mL) solution of the methoxymethyl protected (R)-polymer 4 (3.0 g) was added 6N HCl (20 mL). The mixture was heated to reflux for 16 h and then CH$_2$Cl$_2$ was added. The organic layer was washed with H$_2$O and concentrated. The residue was redissolved in CH$_2$Cl$_2$ and precipitated from MeOH. This procedure was repeated three times. The precipitate was collected and dried in a vacuum to give (R)-polymer 4 (i.e., (R)-3,3'-linked polybinaphthol with a p-dihexyloxybenzene spacer) as a yellow solid (2.3 g, 88.8%). [α]$_D$=+11.79° (c=0.50, THF). $^1$H NMR (CDCl$_3$, 400 MHz) δ 8.49 (s, low intensity), 8.00 (s, 2H), 7.92 (d, J=8.0 Hz, 2H), 7.77 (d, low intensity), 7.34 (m, 6H), 7.24 (m, 2H), 6.32 (s, 2H), 6.15–7.4 (low intensity peaks were observed in this range due to the end groups) 4.01 (m, 4H), 1.66 (m, 4H), 1.26 (m, 4H), 1.13 (m, 8H), 0.73 (m 6H). GPC (THF, polystyrene standards): Mw=6,700, Mn=4,600, PDI=1.46.

Example 2

Preparation of polymer 3 with binaphthol subunits having an (R) enantiomeric configuration, no rigid subunit (i.e., n=0), and X=OH ((R)-6,6'-linked polybinaphthol). Under nitrogen, to a mixture of acetate protected (R)- 6,6'-dibromo-1,1'-bi-2-naphthol (9.5 g, 18.0 mmol), zinc (4.0 g, 61.2 mmol), NiCl$_2$ (0.234 g, 1.80 mmol), PPh$_3$ (1.872 g, 7.2 mmol) and bipyridine (0.288 g, 1.8 mmol) was added DMF (60 mL). The mixture was stirred at 80–90° C. for 24 h. It was then cooled to r.t. and diluted with CH$_2$Cl$_2$ (200 mL). After filtration, the solid was washed with CH$_2$Cl$_2$ (2×50 mL). The combined organic layer was washed with 1N HCl (50 mL) and brine (2×30 mL). The solution was concentrated and precipitated with MeOH. Centrifugation and filtration gave a solid which was redissolved in CH$_2$Cl$_2$ and precipitated with MeOH twice. The resulting solid was dried under vacuum at r.t. for 24 h to give acetate protected (R)-polymer 3 (with n=0) as a white powder (4.85 g, 73.2%). [α]$_D$=−353.0° (c=0.5, THF). IR (KBr) cm$^{-1}$ 1765.0 (s), 1593.3 (m), 1500.7 (m), 1466.0 (m), 1429.3 (w), 1367.6 (s), 1331.0 (w), 1201.7 (s), 1082.1 (w), 1041.6 (w), 1012.7 (s), 884.4 (m), 821.7 (s). $^1$H NMR (CDCl$_3$, 400 MHz) δ 1.89 (s, 6H, CH$_3$), 7.31 (m, 2H), 7.46 (m, H-2), 7.65 (br s, 2H), 8.06 (m, 2H, H-4), 8.21 (br s, 2H, H-5). $^{13}$C NMR (CDCl$_3$, 100 MHz) δ 20.77, 122.6, 123.4, 126.3, 126.6, 127.0, 130.0, 131.96, 132.7, 137.9, 147.0, 169.6. Anal. Calcd for C$_{24}$H$_{16}$O$_4$: C, 78.25; H, 4.38. Found: C, 77.30; H, 4.47.

To a THF solution (150 mL) of acetate protected (R)-polymer 3 (with n=0)(4.30 g) was added a water solution (50 mL) of KOH (5.0 g). The mixture was heated at reflux for 24 h. The aqueous layer was separated and 1N HCl (100 mL) was added to acidify the water solution. A precipitate was generated which was collected by filtration. The solid was then redissolved in 0.5 M KOH and precipitated with 1M HCl again. After washing with H$_2$O, the solid was dried under vacuum at r.t. for 24 h to give (R)-polymer 3 (with n=0) (i.e., (R)-6,6'-linked polybinaphthol) as a light yellow powder (2.80 g, 85%). [α]$_D$=−139.8° C. (c=0.5, 0.5M aqueous KOH). IR (KBr) cm$^{-1}$ 3421.9 (s), 1593.3 (s), 1500.7 (s), 1466.0 (s), 1381.1 (s), 1336.8 (s), 1250.0 (m), 1215.2 (s), 1157.4 (s) , 943.2 (w) , 819.8 (s). $^1$H NMR (400 MHz, 0.5 M NaOD.D$_2$O) δ 7.09 (m, 2H), 7.15 (d, J=8.4 Hz, 2H), 7.46 (m, 2H), 7.81 (d, J=8.8 Hz, 2H), 8.12 (br s, 2H). UV (0.5 M aqueous KOH) λ$_{max}$ 274, 340 nm. CD (0.5 M aqueous KOH) [θ]$_λ$=2.45×10$^4$ (252 nm), −2.57×10$^4$ (276 nm), −1.30×10$^4$ (336 nm), 9.06×10$^3$ (364 nm) and 6.62×10$^3$ (377 nm).

Example 3

Preparation of polymer 3 with binaphthol subunits having an (R) enantiomeric configuration, a p-dihexyloxybenzene rigid subunit, and X=OH. ((R)-6,6'-linked polybinaphthol with a p-dihexyloxybenzene spacer)

After a mixture of methoxymethyl protected (R)-6,6'-dibromo-1,1'-bi-2-naphthol (1.06 g, 2.0 mmol), 2,5-di (boronic acid)-p-dihexyloxybenzene (0.73 g, 2 mmol), Pd(PPh$_3$)$_4$ (116 mg, 0.10 mmol, 5 mol %) in THF (10 mL) and 1N K$_2$CO$_3$ (10 mL) was heated at reflux under nitrogen for 48 h, the organic layer was separated. CH$_2$Cl$_2$ (300 mL) was added to the organic layer, and the solution was washed with brine and dried over Na$_2$SO$_4$. Then the solvent was removed and the residue was redissolved in a minimum amount of CH$_2$Cl$_2$ and precipitated from MeOH. This process was repeated three times. The resulting precipitate was then dissolved in THF (10 mL) and 6N HCl (10 mL) was added. The solution was degassed with nitrogen and was heated at 80° C. for 12 h. CH$_2$Cl$_2$ (200 mL) was then added to extract the hydrolyzed polymer. The organic layer was washed with brine and dried over Na$_2$SO$_4$. After removal of the solvent, the residue was redissolved in a minimum amount of CH$_2$Cl$_2$ and precipitated from MeOH. This process was repeated three times to give (R)-polymer 3 (with a p-dihexyloxybenzene spacer) (i.e., (R)-6,6'-linked polybinaphthol with a p-dihexyloxybenzene spacer) as a pale white solid (yield 85%). GPC (THF, polystyrene standards): Mw=18,500 and Mn=9,000 (PDI=2.06). [α]$_D$=−398.60° (c=1.00, CH$_2$Cl$_2$), $^1$H NMR (CDCl$_3$, 400 MHz) δ 8.16 (s, 2H, short peak at 8.09), 8.01 (m, 2H), 7.64 (m, 2H, short peak at 7.57), 7.42 (m, 2H, short peak at 7.36), 7.27 (m, 2H), 7.10 (s, 2H, short peak at 7.01, 6.93), 3.96 (m, 6H, short peak at 3.90, 3.72, 3.57), 1.68 (m, 4H, short peak at 1.84, 1.76), 1.36 (m, 4H), 1.22 (m, 8H), 0.78 (s, 6H, short peak at 0.90).

Example 4

Reaction of benzaldehyde with diethylzinc in the presence of the polymer of Example 1 to give (R)-1-phenyl-1-propanol. The polymer of Example 1 (28 mg, 0.05 mmol based on the 2,2'-substituted biphenyl subunit) and diethylzinc (0.14 mL, 1.3 mmol) were added to a Schlenk flask containing toluene (10 mL) (dried with Na and degassed with $N_2$), under $N_2$ and at room temperature, to form an organozinc species. After ca. 15 min, the flask was cooled to 0° C. and benzaldehyde (0.1 mL, 1 mmol) was added in a dropwise manner. Stirring was continued at this temperature for 10 h. The $^1$H NMR spectrum of the crude mixture showed 100% conversion with no side product. The reaction was then quenched at 0° C. with the addition of 1N HCl and the aqueous layer was extracted with diethyl ether. The combined organic layer was washed with brine until pH 7 and then dried over anhydrous $Na_2SO_4$. Concentration in vacuum gave a pale yellow oil, which upon treatment with MeOH (20 mL) precipitated the polymer. The filtrate was concentrated and purified by column chromatography on silica gel (eluent: EtOAc/hexanes 1/4) to afford (R)-1-phenyl-1-propanol as a colorless liquid (122 mg, 89%). $^1$H NMR (270 MHz, $CDCl_3$) δ 0.91 (t, J=7.4, 3H), 1.78 (dq, J=7.3, 6.4, 2H), 1.89 (br, 1H), 4.58 (t, J=6.5, 1H), 7.25–7.37 (m, 5H) . $[\alpha]_D$=42.91 (c=2.44, $CHCl_3$). The ee value was determined to be 92.2% on GC with a chiral column (β-Dex capillary column, Supelco Company). The recycled catalyst showed the similar reactivity and the same ee for the product.

Other aldehyde substrates were reacted under similar conditions with diethyl zinc in the presence of the chiral polybinaphthol of Example 1. Table 1 presents the results of these reactions.

Example 5

Reaction of benzaldehyde with diethylzinc in the presence of the polymer of Example 2 to give (R)-1-phenyl-1-propanol. The polymer of Example 2 (28.6 mg, 0.1 mmol based on the 2,2'-substituted biphenyl subunit) and diethylzinc (0.42 mL, 4 mmol) were added to a Schlenk flask containing degassed dry dichloromethane (10 mL), to form an organozinc species. The resulting mixture was stirred at r.t. for 2.5 h. Benzaldehyde (0.2 mL, 2 mmol) was then added and the reaction mixture was stirred at r.t. for 112 h. Water (5 mL) and 1N HCl (5 mL) were added to quench the reaction. The polymer catalyst was filtered off and recovered. The organic layer in the filtrate was separated and the aqueous layer was extracted with dichloromethane. The combined organic extracts were dried over $Na_2SO_4$ and concentrated under reduced pressure. $^1$H NMR spectroscopic analysis of this crude product indicated a complete conversion and the ratio of 1-phenyl-1-propanol to benzyl alcohol (a side product) was 53:47. Column chromatography on silica gel (eluent: EtOAc/hexanes=1/4) gave 1-phenyl-1-propanol as a colorless liquid (117 mg, 43%). GC analysis on a chiral column (β-Dex capillary column, Supelco Company) showed an ee of 13%.

Example 6

Preparation of polymer 4 with binaphthol subunits having an (R) enantiomeric configuration, X=OH ((R)-3,3'-linked polybinaphthol with a p-dihexyloxybenzene spacer), and a molecular weight, $M_w$, of about 24,000. To a flask containing methoxymethyl protected (R)-3,3'-diiodo-1,1'-bi-2-naphthol (13.70 g, 22 mmol), 2,5-di(boronic acid)-p-dihexyloxybenzene (8.0 g, 22.0 mmol), THF (75 mL) and 1 M $K_2O_3$ (100 mL), $Pd(PPh_3)_4$ (0.5 g in 25 mL THF) was added and the reaction mixture was heated at reflux under nitrogen for 36 h. EtOAc was then added, and the organic layer was washed with $H_2O$ and filtered. After removal of EtOAc with a roto-evaporator, the residue polymer was redissolved in $CH_2CCL_2$ and precipitated from MeOH. This procedure was repeated three times. The precipitate was collected and dried under vacuum to give the methoxymethyl protected polymer as a yellow solid polymer in 97% yield (13.90 g). After hydrolysis, GPC analysis of the resulting (R)-3,3'-linked polybinaphthol with a p-dihexyloxybenzene spacer shows its molecular weight is Mw=24,300 and Mn=9,900 (PDI=2.45). Its specific optical rotation is $[\alpha]_D$=−16.6° (c=0.5, THF). $^1$H NMR ($CDCl_3$, 400 MHz) δ 8.01 (s, 2H), 7.92 (d, J=8.0 Hz, 2H), 7.32 (m, 6H), 7.24 (bs, 2H), 6.34 (s, 2H), 4.02 (m, 4H), 1.66 (m, 4H), 1.26 (m, 4H), 1.13 (m, 8H), 0.73 (t, J=7.0 Hz). $^{13}$C NMR ($CDCl_3$, 100 MHz) δ 150.74, 150.47, 133.83, 131.32, 129.35, 128.82, 128.76, 128.37, 126.82, 125.04, 123.96, 117.89, 116.58, 70.75, 31.55, 29.40, 25.63, 22.58, 14.10. UV-vis $\lambda_{max}$ ($CH_2Cl_2$) nm 244, 260, 322. FT-IR (KBr) cm$^{-1}$ 3530.0 (s), 3393.0 (s), 2926.2 (s), 2864.5 (s), 1622.2 (m), 1599.1 (w), 1500.7 (s), 1431.3 (s), 1383.0 (s), 1255.7 (s), 1197.7 (s), 1147.7 (s), 1128.4 (s), 1010.8 (s), 937.5 (m), 891.2 (m), 785.1 (w), 746.5 (s). Anal. Calcd. for $C_{38}H_{40}O_4$: C, 81.40; H, 7.19. Found: C, 80.16; H, 7.21.

Example 7

Reaction of benzaldehyde with diethylzinc in the presence of the polymer of Example 6 to give (R)-1-phenyl-1-propanol. The polymer of Example 6 (Mw=24,300 and Mn=9900, PDI=2.45) was used to catalyze the addition reaction of diethylzinc to an aldehyde according to the procedure of Example 4. For benzaldehyde, the yield was 90% with ee of 92.7% ((R) product). For p-chlorobenzaldehyde, the yield was 95% with ee of 93.8% ((R) product).

Example 8

Preparation of polymer 7 with binaphthol subunits having an (R) enantiomeric configuration and X=OH ((R)-3,3'-linked polybinaphthol with a p-bis(2,5-dihexyloxyphenyl) benzene spacer).

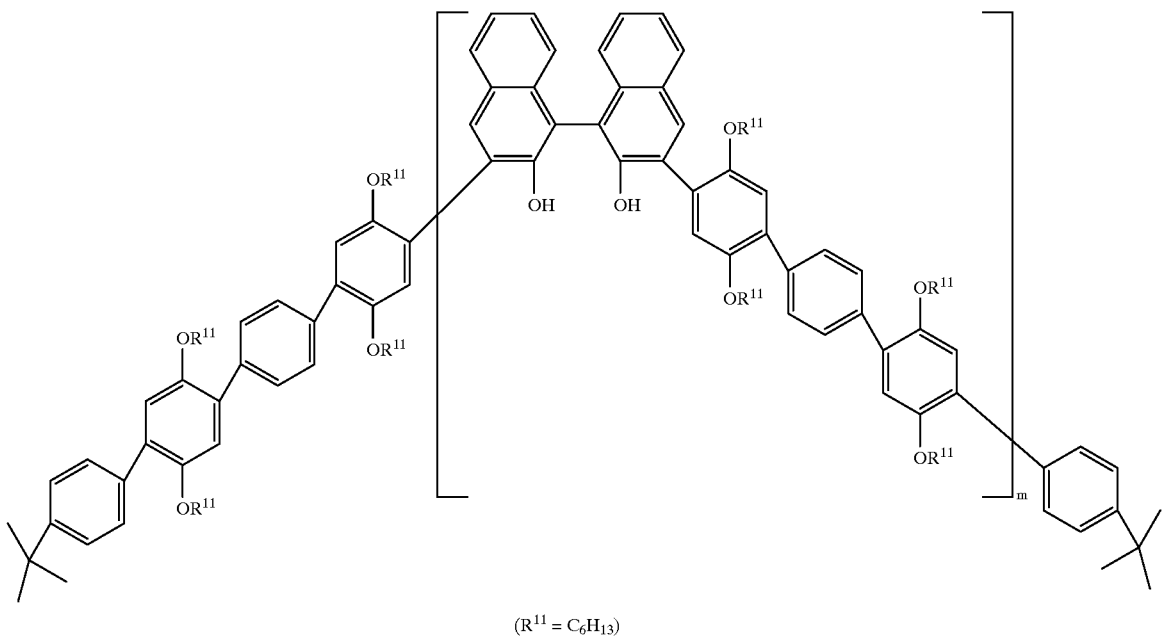

($R^{11} = C_6H_{13}$)

To a mixture of methoxymethyl protected (R)-3,3'-diiodo-1,1'-bi-2-naphthol (5.0 g, 8.0 mmol), p-bis(2,5-dihexyloxy-4-boronic acid-phenyl)benzene (6.20 g, 8.6 mmol), THF (50 mL) and 1M $K_2CO_3$ (50 ml) was added Pd(PPh$_3$)$_4$ (60 mg). After refluxing for 36 hr ($^1$H NMR showed no iodide endgroups), 1-bromo-4-tert-butylbenzene (0.5 ml, 2.9 mmol) was added to the mixture to cap the boronic acid residue end. The mixture was refluxed for another 5.5 h. After cooling to r.t., the mixture was extracted with EtOAc. The combined organic layer was washed with brine. Evaporation of the solvent gave a yellow residue. The residue was redissolved in $CH_2Cl_2$ and precipitated from MeOH. This procedure was repeated three times. After drying under vacuum, a yellow solid was obtained, 7.55 g (94%). GPC (polystyrene as standard): Mw=23,999; Mn=12,176; PDI= 1.97; [α]D=−140.98 (c=1.00, $CH_2Cl_2$); Hydrolysis of this polymer (6N HCl/THF, reflux for 17h) gave polymer 7 having the (R) configuration in 96% yield. [α]D=−92.9 (c=1.01, $CH_2Cl_2$). UV ($CH_2Cl_2$: λ(nm): 234, 276, 338. GPC(polystyrene as standard): Mw=25,799; Mn=14,322; PDI=1.80. $^1$H NMR(CDCl$_3$, 400MHz): δ: 0.769(t, J=7. 0Hz, 6H), 0.893(m, 6H), 1.165(m, 8H), 1.319(m, 20H), 1.455(m, 4H), 1.680(m, 4H), 1.785(m, 4H), 4.012(m, 8H), 6.494(s, 2H), 7.139(s, 2H), 7.229(s, 2H), 7.309(m, 2H), 7.379(m, 4H), 7.720(s, 4H), 7.960(d, J=8. 0Hz, 2H), 8.051(s, 2H). $^{13}$C. NMR(CDCl$_3$, 100 MHz): δ: 14.16, 14.25, 22.63, 22.81, 25.69, 25.98, 29.47, 29.50, 31.64, 31.66, 69.62, 71.00, 116.84, 117.00, 117.57, 123.94, 125.14, 126.74, 128.01, 128.39, 129.17, 129.31, 129.42, 131.17, 131.47, 133.88, 137.09, 150.04, 150.52, 151.30. IR(KBr): $\upsilon_{cm}^{-1}$: 3528.4(s), 3055.4(w), 2928.1(s), 2858.7(s), 1622.2(w), 1491.1(s), 1467.9(s), 1435.1(s), 1385.0(s), 1255.7(s), 1201.7(s), 1147.7 (m), 1122.6(m), 1018.5(s), 941.3(w), 895.0(w), 835.2(m), 788.9(w), 746.5(s); CD($CH_2Cl_2$): λ(nm): 343.0(−8.72×10$^4$), 305.0(8.59×10$^3$), 290.0(−2.66×10$^3$), 257.5(1.10×10$^5$), 235.0 (−1.87×10$^5$), 221.0(4.63×10$^4$). Anal. calcd for $C_{62}H_{72}O_6$: C 81.54, H 7.95; Found: C 81.40, H 8.00

Example 9

Reaction of aldehydes with diethylzinc in the presence of the polymer of Example 8 to give alcohols. The polymer of Example 8 was used to catalyze the addition reaction of diethylzinc to an aldehyde according to the procedure of Example 4. Results are presented in Table 2.

Example 10

Preparation of (R)-3,3'-bis(2",5"-dihexyloxyphenyl)-1,1'-bi-2-naphthol. Under $N_2$ and at −78° C., n-BuLi (23.8 mL, 2.5M in hexanes) was added, over 30 min, to a solution of 1,4-dihexyloxy-2,5-dibromobenzene (25.92 g., 59.45 mmol) in THF (150 mL). After the addition, the reaction mixture was stirred at −78° C. for 1 h and was then quenched with aq. $NH_4Cl$ at −78° C. After the usual workup, 1,4-dihexyloxy-2-bromobenzene was obtained as a pale yellow liquid (97% yield).

To a solution of 1,4-dihexyloxy-2-bromobenzene (10.71 g, 30 mmol) in THF (100 mL) was added n-BuLi (12 mL, 2.5 M in hexanes) at −78° C. over 10 min. After the addition, the reaction mixture was stirred at −78° C. for 30 min and was than cannulated into a solution of triethylborate (3 eq., 15 mL) in THF (80 mL) at −78° C. The mixture was stirred at −78° C. for 2 h and then at r.t. overnight. Hydrolysis of the resulting product solution with 2N HCl at r.t. for 2 h followed, after usual workup, by column chromatography on silica gel (hexanes/EtOAc=5/1) gave 1,4-dihexyloxy-2-(boronic acid)-benzene, a pure white solid (68% yield).

Under $N_2$, to a solution of (R)-2,2'-bis(methoxymethoxy)-3,3'-diiodo-1,1'-binaphthyl (2.63 g, 4.21 mmol) and 1,4-dihexyloxy-2-(boronic acid)-benzene (4.07 g, 12.63 mmol) in THF (50 mL) were added Pd[(PPh$_3$)]$_4$ (250 mg) and $K_2CO_3$ (aq. 2 M, 20 mL, degassed with $N_2$) sequentially. The reaction mixture was heated at reflux for 22 h and then quenched with brine at r.t. After usual workup, column chromatography on silica gel (hexanes/EtOAc=10/1) gave (R)-2,2'-bis(methoxymethoxy)-3,3'-bis(2",5"-dihexyloxyphenyl)-1,1'-binaphthyl as a colorless oil (88% yield). $^1$H NMR (270 MHz, CDCl$_3$) δ 7.88 (s, 2H), 7.83 (d, J=8.0 Hz, 2H), 7.33–7.41 (m, 4H), 7.24–7.29 (m, 2H), 7.03

(d, J=2.7 Hz, 2H), 6.88 (s, 2H), 6.86 (d, J=2.7 Hz, 2H), 4.46 (d, J=5.6 Hz, 2H), 4.41 (d, J=5.6 Hz, 2H), 3.94 (t, J=6.5 Hz, 4H), 3.89 (t, J=6.9 Hz, 4H), 2.35 (s, 6H), 1.77 (m, 4H), 1.64 (m, 4H), 1.45 (m, 4H), 1.16–1.35 (m, 20H), 0.89 (t, J=6.9 Hz, 6H) , 0.77 (t, J=6.9 Hz, 6H)

To a solution of (R)-2,2'-bis(methoxymethoxy)-3,3'-bis (2",5"-dihexyloxyphenyl)-1,1'-binaphthyl (3.0 g) in a mixed solvent (10 mL $CH_2Cl_2$ and 30 mL EtOH) was added conc. HCl (5 mL). The reaction mixture was heated at reflux for 16 h. The volatile component was removed under reduced pressure and the residue was purified by column chromatography on silica gel (hexanes/EtOAc=10/1) to give (R)-3,3'-bis(2",5"-dihexyloxyphenyl)-1,1'-bi-2-naphthol as a colorless oil (85% yield). $^1H$ NMR (270 MHz, $CDCl_3$) δ 7.96 (s, 2H), 7.91 (d, J=8.0 Hz, 2H), 7.25–7.38 (m, 6H), 7.12 (d, J=2.5 Hz, 2H), 6.96 (s, 2H), 6.94 (d, J=2.7 Hz, 2H), 6.32 (s, 2H), 3.99 (t, J=6.5 Hz, 4H), 3.89 (t, J=6.7 Hz, 4H), 2.35 (s, 6H), 1.81 (m, 4H), 1.63 (m, 4H), 1.49 (m, 4H), 1.33–1.40 (m, 8H), 1.21–1.28 (m, 4H), 1.11–1.26 (m, 8H), 0.93 (t, J=6.9 Hz, 6H), 0.76 (t, J=6.9 Hz, 6H).

Example 11

Reaction of benzaldehyde with diethylzinc in the presence of (R)-3,3'-bis(2",5"-dihexyloxyphenyl)-1,1'-bi-2-naphthol to give (R)-1-phenyl-1-propanol. (R)-3,3'-bis(2",5"-dihexyloxyphenyl)-1,1'-bi-2-naphthol (42 mg, 0.05 mmol) and diethylzinc (0.21 mL, 2 mmol) were added to a Schlenk flask containing toluene (10 mL, dried with Na and degassed with $N_2$) , under nitrogen and at room temperature, to form the organozinc species. The resulting mixture was stirred at r.t. for ca. 15 min. The flask was cooled to 0° C. and benzaldehyde (0.1 mL, 1 mmol) was then added dropwise. The yellow color of the mixture faded in 4 hours, which indicated the completion of the reaction. 1N HCl was added to quench the reaction at 0° C. and the aqueous layer was extracted with ether. The combined organic extracts were washed with brine until pH=7 and then dried over anhydrous $Na_2SO_4$. The purification by column chromatography on silica gel with EtOAc/hexanes (1:5) gave (R)-1-phenylpropanol as a colorless liquid (129 mg, 95%). HPLC analysis on a Chiracel-OD column (eluent: isopropanol/hexane=1/9; 1 mL/min) indicated an ee of 99.3%. The retention time of the (R)-isomer is 7.45 min and (S)-isomer is 8.8 min. $^1H$ NMR (270 MHz, $CDCl_3$): 0.90 (t, J=7.5, 3H), 1.74 (m, 2H), 2.73 (s, 1H), 4.52 (t, J=6.5, 1H), 7.23–7.38 (m, 5H).

Other aldehyde substrates were reacted under similar conditions with diethylzinc in the presence of the chiral binaphthol of Example 10. Table 3 presents the results.

Example 12

Preparation of (S)-6,6'-dibromo-2-hydroxy-2'-methoxy-1,1'-binaphthalene. To a suspension of 6,6'-dibromo-1,1'-bi-2-naphthol (7.75 g, 17.5 mmol) and $K_2CO3$ (3.6 g, 26.3 mmol) in acetone was added $CH_3I$ (1.2 mL, 24.2 mmol) at r.t. The mixture was stirred at r.t. for 32 h. The reaction was monitored by $^1H$ NMR spectroscopy. When the dialkylated side product started to form, the reaction was quenched by pouring the mixture into water. After extraction with EtOAc (3×100 mL), the combined organic layers were washed with brine (3×20 mL) and dried over $Na_2SO_4$. The solvent was evaporated in vacuo and the crude product was purified by flash chromatography (silica gel, EtOAc/Hexane 20:1) to give (S)-6,6'-dibromo-2-hydroxy-2'-methoxy-1,1'-binaphthalene as a white crystalline solid (3.1 g, 40.0%, m.p. 92–94° C.).

Example 13

Preparation of polymer 3 with binaphthol subunits having an (S) enantiomeric configuration, a p-dihexyloxybenzene spacer subunit, and X=$OCH_3$. ((S)-6,6'-linked methoxylated polybinaphthol with a p-dihexyloxybenzene spacer) . Under $N_2$, a mixture of 2-acetyloxy-2'-methoxy-6,6'-dibromo-1,1'-binaphthalene (0.50 g, 1.0 mmol, derived by acetylation of the product of Example 12), 2,4-di(boronic acid)-p-dihexyloxybenzene (0.50 g, 1.0 mmol), $Pd(PPh_3)_4$ (5 mol %) in THF (5 mL) and 1N $K_2CO_3$ (5 mL) was heated at reflux under nitrogen for 48 h. Then, KOH (0.56 g) was added and the mixture was heated at reflux under $N_2$ for another 12 h. The organic layer was separated and was combined with $CH_2Cl_2$ (500 mL). After washed with brine and dried over $Na_2SO_4$, the solvent was removed with roto-evaporation. The residue was redissolved in a minimum amount of $CH_2Cl_2$ and was precipitated with the addition of MeOH. This procedure was repeated three times to give polymer 3 with an (S) enantiomeric configuration, a p-dihexyloxybenzene spacer subunit, and X=$OCH_3$. ((S)-6,6'-linked, methoxylated polybinaphthol with a p-dihexyloxybenzene spacer). The product was a yellow solid with 75% yield.

The invention has been described with reference to various specific and preferred embodiments and techniques. However, it will be apparent to one of ordinarily skill in the art that many variations and modifications may be made while remaining within the spirit and scope of the invention.

All publications and patent applications in this specification are indicative of the level of ordinary skill in the art to which this invention pertains. All publications and patent applications are herein incorporated by reference to the same extent as if each individual publication or patent application was specifically and individually indicated by reference.

TABLE 1

Asymmetric Reaction of Aldehydes with Diethylzinc in the Presence of the Chiral Polybinaphthol of Example 1.

| Aldehyde | Yield (%) | ee (%) | Product Configuration |
|---|---|---|---|
| benzaldehyde | 89 | 92.2 | R |
| " | 91 | 92.0[a] | R |
| " | 70[b] | 84.7 | R |
| " | 92[c] | 91.7 | R |
| p-tolualdehyde | 90 | 92.5[a] | R |
| p-chlorobenzaldehyde | 94 | 93.4[a] | R |
| p-anisaldehyde | 84 | 88.3[a,d] | R |
| trans-cinnamaldehyde | 86 | 89.7[a,e] | R |
| 3,3,7-trimethyl-6-octen-1-al | 67 | 82.8[a,e] | $[α]_D$ = −13.25 (c = 1.95, THF) |
| nonanal | 89 | 73.5[e] | R |
| cyclohexanecarboxaldehyde | 70 | 83.3[a,e] | R |
| hexanal | 65 | 74.3[a,e] | R |

[a]Recycled polymer was used.
[b]Tetrahydrofuran (THF) was used as the solvent.
[c]A 2:1 mixture of hexane/toluene was used as the solvent.
[d]The ee was measured by HPLC-Chiracel OD column.
[e]The ee was measured by analyzing the acetate derivative of the product on the GC-β-Dex capillary column.

TABLE 2

Asymmetric Reaction of Aldehydes with Diethylzinc and the Chiral Polymer of Example 8.

| Aldehyde | Yield (%) | ee (%) |
|---|---|---|
| benzaldehyde | 92 | 97.7 |
| " | 90 | 97.6[f] |
| p-tolualdehyde | 90 | 98.1[a] |
| p-anisaldehyde | 89 | 96.8 |
| p-chlorobenzaldehyde | 94 | 98.0[a] |
| o-fluorobenzaldehyde | 88 | 91.2[a] |
| o-anisaldehyde | 90 | 92.6[a] |
| m-anisaldehyde | 93 | 97.9 |
| 1-naphthylaldehyde | 93 | 98.1 |
| 2-naphthylaldehyde | 95 | 96.0 |
| trans-cinnamaldehyde | 93 | 91.9[e] |
| α-methyl-trans-cinnamaldehyde | 92 | 97.3 |
| hexanal | 71 | 97.6[a,b] |
| octanal | 85 | 97.3[a,b] |
| nonanal | 88 | 97.4[a,b] |
| cyclohexanecarboxaldehyde | 81 | 98.0[a,c] |
| 3-methyl-butanal | 64.6 | 97.8[a,d] |

[a]The ee was measured with a chiral GC-β-Dex capillary column.
[b]The ee was measured by analyzing the acetate derivative of the product.
[c]The ee was measured by analyzing the propionate derivative of the product.
[d]The ee was measured by analyzing the Mosher's ester of the product.
[e]The solvent was a 1:1 mixture of toluene:diethyl ether.
[f]The recovered catalyst was used.

TABLE 3

Asymmetric Reaction of Aldehydes with Diethylzinc and the Chiral Binaphthol of Example 10

| Aldehyde | Yield (%) | ee (%) | Reaction Time (hours) |
|---|---|---|---|
| benzaldehyde | 95 | 99.3 | 4 |
| p-tolualdehyde | 91 | 98.1[a] | 4 |
| p-anisaldehyde | 92 | 97.2 | 6 |
| p-chlorobenzaldehyde | 96 | 99.9 | 4 |
| m-chlorobenzaldehyde | 97 | 98.4[a,b] | 4 |
| m-anisaldehyde | 95 | 98.6 | 6 |
| o-fluorobenzaldehyde | 93 | 94.2[a] | 4 |
| o-anisaldehyde | 90 | 94.3[a] | 8 |
| 1-naphthylaldehyde | 92 | 99.9 | 6 |
| 2-naphthylaldehyde | 94 | 98.5 | 5 |
| 2-furaldehyde | 90 | 90.7[a,b] | 6 |
| trans-cinnamaldehyde | 91 | 91.7 | 24 |
| α-methyl-trans-cinnamaldehyde | 86 | 98.4[a,b] | 27 |
| hexanal | 89 | 97.7[a,b] | 40 |
| heptanal | 86 | 97.8[a,b] | 24 |
| nonanal | 91 | 98.0[a,b] | 45 |
| cyclohexanecarboxaldehyde | 90 | 98.1[a,b] | 40 |
| 3-methyl-butanal | 73 | 98.1[a,c] | 30 |
| crotonaldehyde | 66 | 90.8[a,d] | 18 |
| 3-methyl-2-butenal | 62 | 92.5[a,e,g] | 40 |
| phenylpropargyl aldehyde | 90 | 92.9[e,f] | 15 |
| 2-methyl-2-butenal | 64 | 96.5[a] | 18 |
| 2-butylacrolein | 90 | 98.2[a,b] | 18 |

[a]The ee was measured with a chiral GC-β-Dex capillary column.
[b]The ee was measured by analyzing the acetate derivative of the product.
[c]The ee was measured by analyzing the benzoate derivative of the product.
[d]Et$_2$O was used as the solvent.
[e]0.2 equivalents of catalyst was used and the reaction temperature was −10° C.
[f]Tetrahydrofuran was the solvent and the aldehyde was distilled.
[g]0.3 equivalents of catalyst was used and the reaction temperature was −40° C.

We claim:

1. A biphenyl compound having the formula:

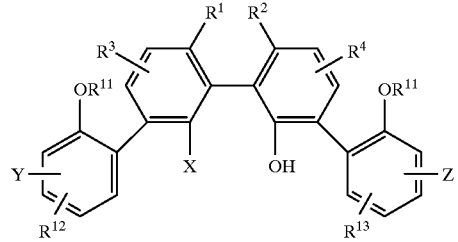

wherein X is —OR$^{18}$, —NR$^{19}$R$^{20}$, or —SR$^{21}$, wherein R$^{18}$, R$^{19}$, R$^{20}$, and R$^{21}$ are independently, hydrogen, alkyl, cycloalkyl, aryl, or aralkyl, Y and Z are independently H, Cl, Br, I, B(OH)$_2$, or substituted or unsubstituted aryl or aralkyl, R$^1$ and R$^2$ are hindering groups wherein R$^1$, R$^2$ or a combination thereof provides sufficient hindrance to internal rotation such that the 2,2'-substituted biphenyl subunits have an enantiomeric interconversion rate of no more than about 1% per hour at 100° C., R$^3$ and R$^4$ are independently hydrogen, alkyl, alkoxy, alkynyl, aryl, aralkyl, vinyl, trialkylsilyl, triarylsilyl, —CONR$^5$R$^6$, —CO$_2$R$^7$, —SO$_2$R$^8$, —NR$^9$R$^{10}$, or halogen, wherein R$^5$, R$^6$, R$^7$, R$^8$, R$^9$ and R$^{10}$ are independently alkyl, aralkyl or aryl, or R$^1$ and R$^3$ form a substituted or unsubstituted first fused ring or R$^2$ and R$^4$ form a substituted or unsubstituted second fused ring, R$^{11}$ is alkyl or cycloalkyl, and R$^{12}$ and R$^{13}$ are independently hydrogen, halogen, alkyl, cycloalkyl, alkoxy, cycloalkoxy, trialkylsilyl, or triarylsilyl.

2. The biphenyl compound of claim 1, wherein R$^1$ and R$^2$ are independently alkyl, alkoxy, phenyl, benzyl, —CONR$^5$R$^6$, —CO$_2$R$^7$, SO$_2$R$^8$, alkynyl, vinyl or NR$^9$R$^{10}$.

3. The biphenyl compound of claim 1, wherein the first fused ring is substituted with one or more substitutes selected from the group consisting of alkyl, alkoxy, phenyl, benzyl, —CONR$^5$R$^6$, —CO$_2$R$^7$, SO$_2$R$^8$, alkynyl, vinyl, nitro, halogen, and NR$^9$R$^{10}$, wherein R$^5$, R$^6$, R$^7$, R$^8$, R$^9$, and R$^{10}$ are independently alkyl, aralkyl or aryl.

4. The biphenyl compound of claim 1, wherein the second fused ring is substituted with one or more substitutes selected from the group consisting of alkyl, alkoxy, phenyl, benzyl, —CONR$^5$R$^6$, —CO$_2$R$^7$, SO$_2$R$^8$, alkynyl, vinyl, nitro, halogen, and NR$^9$R$^{10}$, wherein R$^5$, R$^6$, R$^7$, R$^8$, R$^9$, and R$^{10}$ are independently alkyl, aralkyl or aryl.

5. The biphenyl compound of claim 1, wherein X is —OH.

6. The biphenyl compound of claim 1, wherein at least about 75% of the biphenyl subunits have a same enantiomeric configuration.

7. The biphenyl compound of claim 1, wherein R$^{11}$ is C3–C8 alkyl.

8. The biphenyl compound of claim 1, wherein the biphenyl compound has the formula:

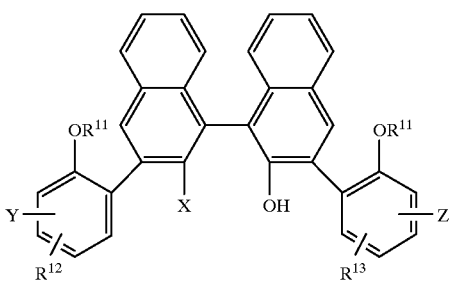

9. The biphenyl compound of claim 8, wherein the biphenyl compound has the formula:

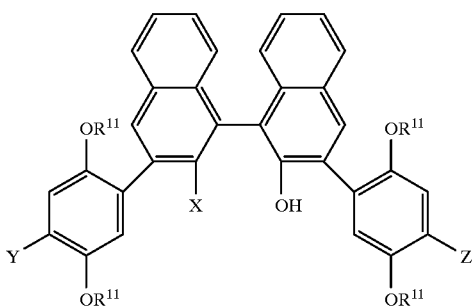

10. The biphenyl compound of claim 9, wherein the $R^{11}$ is C3–C8 alkyl.

11. An organozinc species, comprising a reaction product of:

a) a biphenyl compound having the formula:

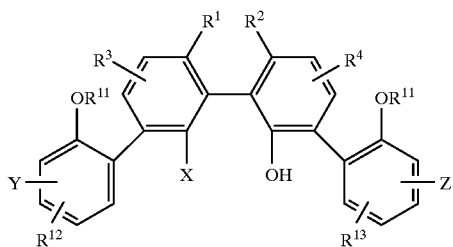

wherein X is —$OR^{18}$, —$NR^{19}R^{20}$, or —$SR^{21}$, wherein $R^{18}$, $R^{19}$, $R^{20}$ and $R^{21}$ are independently hydrogen, alkyl, cycloalkyl, aryl, or aralkyl, Y and Z are independently H, Cl, Br, I, B(OH)$_2$, or substituted or unsubstituted aryl or aralkyl, $R^1$ and $R^2$ are hindering groups wherein $R^1$, $R^2$ or a combination thereof provides sufficient hindrance to internal rotation such that the 2,2'-substituted biphenyl subunits have an enantiomeric interconversion rate of no more than about 1% per hour at 100° C., $R^3$ and $R^4$ are independently hydrogen, alkyl, alkoxy, alkynyl, aryl, aralkyl, vinyl, trialkylsilyl, triarylsilyl, —$CONR^5R^6$, —$CO_2R^7$, —$SO_2R^8$, —$NR^9R^{10}$, or halogen, wherein $R^5$, $R^6$, $R^7$, $R^8$, $R^9$ and $R^{10}$ are independently alkyl, aralkyl or aryl, or $R^1$ and $R^3$ form a substituted or unsubstituted first fused ring or $R^2$ and $R^4$ form a substituted or unsubstituted second fused ring, $R^{11}$ is hydrogen, alkyl, or cycloalkyl, and $R^{12}$ and $R^{13}$ are independently hydrogen, halogen, alkyl, cycloalkyl, alkoxy, cycloalkoxy, trialkylsilyl, or triarylsilyl; and b) an organozinc compound, $R^{14}R^{15}$Zn, wherein $R^{14}$ is a substituted or unsubstituted alkyl, alkenyl, alkynyl, aryl, aralkyl, benzoyl, or a trialkylsilyl- or triarylsilyl-substituted alkyl group and $R^{15}$ is a substituted or unsubstituted alkyl, alkenyl, alkynyl, aryl, aralkyl, or benzoyl group.

12. The organozinc species of claim 11, wherein $R^1$ and $R^2$ are independently alkyl, alkoxy, phenyl, benzyl, —$CONR^5R^6$, —$CO_2R^7$, $SO_2R^8$, alkynyl, vinyl or $NR^9R^{10}$.

13. The organozinc species of claim 11, wherein the first fused ring is substituted with one or more substitutes selected from the group consisting of alkyl, alkoxy, phenyl, benzyl, —$CONR^5R^6$, —$CO_2R^7$, $SO_2R^8$, alkynyl, vinyl, nitro, halogen, and $NR^9Rl^{10}$, wherein $R^5$, $R^6$, $R^7$, $R^8$, $R^9$, and $R^{10}$ are independently alkyl, aralkyl or aryl.

14. The organozinc species of claim 11, wherein the second fused ring is substituted with one or more substitutes selected from the group consisting of alkyl, alkoxy, phenyl, benzyl, —$CONR^5R^6$, —$CO_2R^7$, $SO_2R^8$, alkynyl, vinyl, nitro, halogen, and $NR^9R^{10}$, wherein $R^5$, $R^6$, $R^7$, $R^8$, $R^9$, and $R^{10}$ are independently alkyl, aralkyl or aryl.

15. The organozinc species of claim 11, wherein X is —OH.

16. The organozinc species of claim 11, wherein at least about 75% of the biphenyl subunits have a same enantiomeric configuration.

17. The organozinc species of claim 11, wherein $R^{11}$ is C3 to C8 alkyl.

18. The organozinc species of claim 11, wherein the biphenyl compound has the formula:

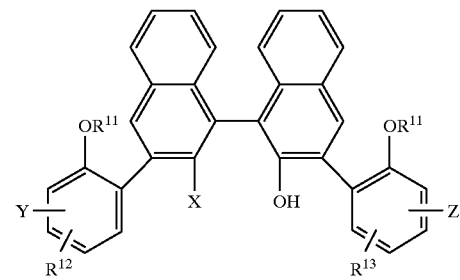

19. The organozinc species of claim 18, wherein the biphenyl compound has the formula:

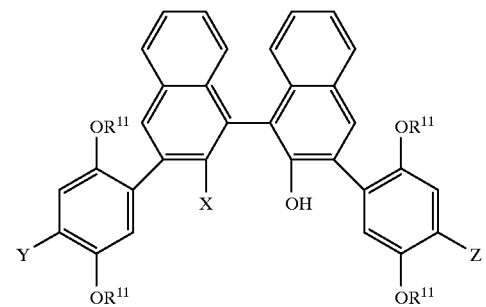

20. The organozinc species of claim 19, wherein the $R^{11}$ is C3 to C8 alkyl.

21. The organozinc species of claim 11, wherein $R^{14}$ and $R^{15}$ are C1 to C8 alkyl.

22. A biphenyl compound having the formula:

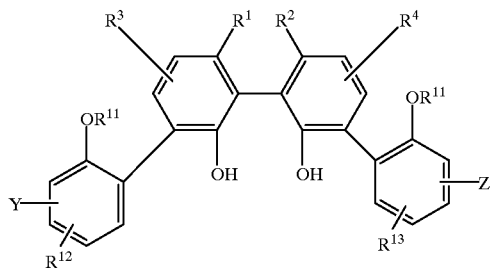

wherein Y and Z are independently H, Cl, Br, I, B(OH)$_2$, or substituted or unsubstituted aryl or aralkyl, $R^1$ and $R^2$ are hindering groups wherein $R^1$, $R^2$ or a combination thereof provides sufficient hindrance to internal rotation such that the 2,2'-substituted biphenyl subunits have an enantiomeric interconversion rate of no more than about 1% per hour at 100° C., $R^3$ and $R^4$ are independently hydrogen, alkyl, alkoxy, alkynyl, aryl, aralkyl, vinyl, trialkylsilyl, triarylsilyl, —CONR$^5$R$^6$, —CO$_2$R$^7$, —SO$_2$R$^8$, —NR$^9$R$^{10}$, or halogen, wherein R$^5$, R$^6$, R$^7$, R$^8$, R$^9$ and R$^{10}$ are independently alkyl, aralkyl or aryl, or $R^1$ and $R^3$ form a substituted or unsubstituted first fused ring or $R^2$ and $R^4$ form a substituted or unsubstituted second fused ring, $R^{11}$ is hydrogen, alkyl, or cycloalkyl, and $R^{12}$ and $R^{13}$ are independently hydrogen, halogen, alkyl, cycloalkyl, alkoxy, cycloalkoxy, trialkylsilyl, or triarylsilyl.

23. The biphenyl compound of claim 21, wherein the biphenyl compound has the formula:

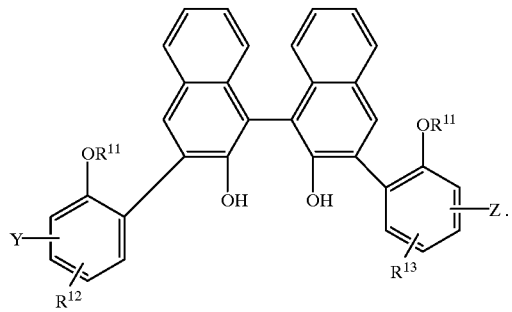

24. The biphenyl compound of claim 21, wherein the biphenyl compound has the formula:

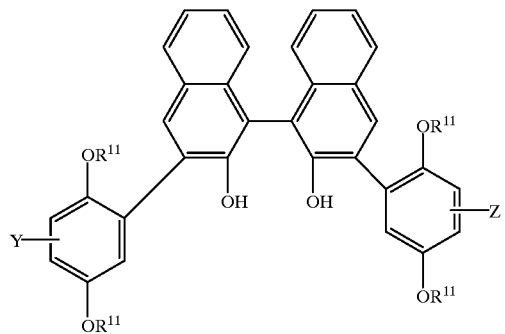

25. The biphenyl compound of claim 22, wherein at least about 75% of the biphenyl subunits have a same enantiomeric configuration.

26. The biphenyl compound of claim 22, wherein $R^{11}$ is C3–C8 alkyl.

* * * * *

UNITED STATES PATENT AND TRADEMARK OFFICE
CERTIFICATE OF CORRECTION

PATENT NO. : 6,020,452
DATED : FEBRUARY 1, 2000
INVENTOR(S) : PU ET AL.

It is certified that error appears in the above-identified patent and that said Letters Patent is hereby corrected as shown below:

Col. 15, line 33: delete "." between "7.39" and "(m, 4H)"

Col. 21, line 55: "K$_2$CO3" should read --K$_2$CO$_3$--

Signed and Sealed this

Seventeenth Day of April, 2001

Attest:

NICHOLAS P. GODICI

Attesting Officer            Acting Director of the United States Patent and Trademark Office